United States Patent
Nakano

(10) Patent No.: US 11,886,662 B2
(45) Date of Patent: Jan. 30, 2024

(54) SENSING DEVICE AND DRIVING METHOD OF SENSING DEVICE

(71) Applicant: Japan Display Inc., Tokyo (JP)

(72) Inventor: Fumihoru Nakano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/104,904

(22) Filed: Feb. 2, 2023

(65) Prior Publication Data

US 2023/0251738 A1 Aug. 10, 2023

(30) Foreign Application Priority Data

Feb. 10, 2022 (JP) .................. 2022-019511

(51) Int. Cl.
*G06F 3/041* (2006.01)
*G06F 3/044* (2006.01)

(52) U.S. Cl.
CPC .................. *G06F 3/04166* (2019.05)

(58) Field of Classification Search
None
See application file for complete search history.

(56) References Cited

U.S. PATENT DOCUMENTS

| 10,222,916 | B2 * | 3/2019 | Ishii | G06F 3/041661 |
| 2014/0313146 | A1 * | 10/2014 | Munechika | G06F 3/041 345/173 |
| 2015/0212623 | A1 * | 7/2015 | Hatano | G06F 3/04186 345/174 |

FOREIGN PATENT DOCUMENTS

JP 2021-086538 A 6/2021

* cited by examiner

*Primary Examiner* — Krishna P Neupane
(74) *Attorney, Agent, or Firm* — K&L Gates LLP

(57) ABSTRACT

A sensing device includes a plurality of sensing electrodes arranged in a row direction and a column direction, a sensing circuit including a plurality of read-out circuits respectively connected to the plurality of sensing electrodes and a control circuit for controlling the plurality of read-out circuits, and an arithmetic circuit that arithmetically is configured to process a sensing signal output from the sensing circuit. The plurality of sensing circuits and the plurality of read-out circuits are connected one-to-one via wiring. The sensing circuit is configured to store a driving table storing multiple sampling frequencies different from each other. The control circuit is configured to read out the multiple sampling frequencies, drives simultaneously the plurality of read-out circuits at the multiple sampling frequencies, and output a plurality of output signals to the arithmetic circuit. The arithmetic circuit is configured to calculate the amount of noise using the multiple sampling frequencies.

9 Claims, 24 Drawing Sheets

FIG. 6

| MODE | Noise Scan | | | | Signal Scan | | | |
|---|---|---|---|---|---|---|---|---|
| TABLE | table A (TA) | table B (TB) | table C (TC) | table D (TD) | table E (TE) | table F (TF) | table G (TG) | table H (TH) |
| Driving frequency [kHz] | L(Low) fixed | L(Low) fixed | L(Low) fixed | L(Low) fixed | FA | FB | FC | FD |
| Sampling frequency [kHz] | FA | FB | FC | FD | FA | FB | FC | FD |

FIG. 23 ously the plurality of read-out circuits at the multiple sampling frequencies different from each other, generating a plurality of output signals obtained by the driving, performing arithmetic processing on the plurality of output signals read-out using the multiple sampling frequencies different from each other, and calculating the amount of noise.

SENSING DEVICE AND DRIVING METHOD OF SENSING DEVICE

CROSS-REFERENCE TO RELATED APPLICATIONS

This application claims the benefit of priority from the prior Japanese Patent Application No. 2022-019511 filed on Feb. 10, 2022, the entire contents of which are incorporated herein by reference.

FIELD

An embodiment of the present invention relates to a sensing device and a driving method of the sensing device.

BACKGROUND

A touch panel is known as an interface for a user to input information. For example, the touch panel detects coordinates of a sensing object (for example, user's finger or a touch pen) in contact with the touch panel by using a signal input to a sensor provided on the touch panel.

For example, when noise is superimposed on a signal input to the sensor, there is a possibility that an error occurs between the coordinates of the sensing object sensed by the touch panel and the coordinates of the actual sensing object. On the other hand, in recent years, a touch panel device that can easily determine the presence or absence of noise without using a complicated filter technique has been developed.

SUMMARY

A sensing device in an embodiment according to the present invention includes a plurality of sensing electrodes arranged in a row direction and a column direction, a sensing circuit including a plurality of read-out circuits respectively connected to the plurality of sensing electrodes and a control circuit for controlling the plurality of read-out circuits, and an arithmetic circuit that processes a sensing signal output from the sensing circuit, wherein the plurality of sensing electrodes and the plurality of read-out circuits are connected one-to-one via wiring, the sensing circuit is configured to store a driving table that stores multiple sampling frequencies different from each other, the control circuit is configured to read out the multiple sampling frequencies from the driving table, drive simultaneously the plurality of read-out circuits by using the multiple sampling frequencies, and output a plurality of output signals obtained by the driving to the arithmetic circuit, and the arithmetic circuit is configured to process the plurality of output signals from the control circuit, and to calculate the amount of noise.

A driving method of a sensing device in an embodiment according to the present invention includes the sensing device including a plurality of sensing electrodes arranged in a row direction and a column direction, a sensing circuit including a plurality of read-out circuits respectively connected to the plurality of sensing electrodes and a control circuit for controlling the plurality of read-out circuits, and an arithmetic circuit that arithmetically processes a sensing signal output from the sensing circuit, the plurality of sensing circuits and the plurality of read-out circuits are connected one-to-one via wiring, the sensing circuit stores a driving table that stores multiple sampling frequencies different from each other, reading out the multiple sampling frequencies different from each other, driving simultane-

BRIEF DESCRIPTION OF DRAWINGS

FIG. 6 is a diagram for explaining a driving method of a sensing device according to an embodiment of the present invention.

FIG. 23 is a diagram for explaining an example of step 415 (S415) of a driving method of a sensing device according to an embodiment of the present invention.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. In order to make the description clearer, although the drawings may be schematically represented with respect to configurations and the like of the respective parts as compared with actual embodiments, they are merely examples, and do not limit the interpretation of the present invention. Further, in the present specification and the drawings, the same symbols (or symbols denoted by A, B, a, b, and the like after numbers) are given to elements similar to those described above with respect to the above-mentioned figures, and detailed description thereof may be omitted as appropriate. The terms "first" and "second" appended to each element are convenience signs used to distinguish each element, and do not have any further meaning unless otherwise specified.

Not only a contact-type sensing device for specifying the position of a sensing object by the sensing object contacting a detection surface of the sensing device, but also a so-called hover detection (proximity detection/non-contact-type detection) sensing device for sensing the proximity state of the sensing object even in a state where the sensing object does not touch the detection surface is known as a sensing device for sensing the position of a sensing object. For example, a sensing device having a hover detection function includes a plurality of detection electrodes spread over the detection surface. Capacitance is formed between the sensing object and each detection electrode, which is separated from the detection surface. In this type of sensing device, although it is necessary to sense a subtle change in capacitance in order to three-dimensionally specify the position of the sensing object, there is a possibility that the accuracy of specifying the sensed position may decrease due to unexpected noise input from the sensing object itself or the surroundings.

An embodiment of the present disclosure is to provide a noise-reduced sensing device and a driving method of the sensing device.

A noise-reduced sensing device and a driving method of the sensing device will be exemplified in some embodiments described below.

1. First Embodiment 1-1. Configuration of Sensing Device 10

Figure 1:
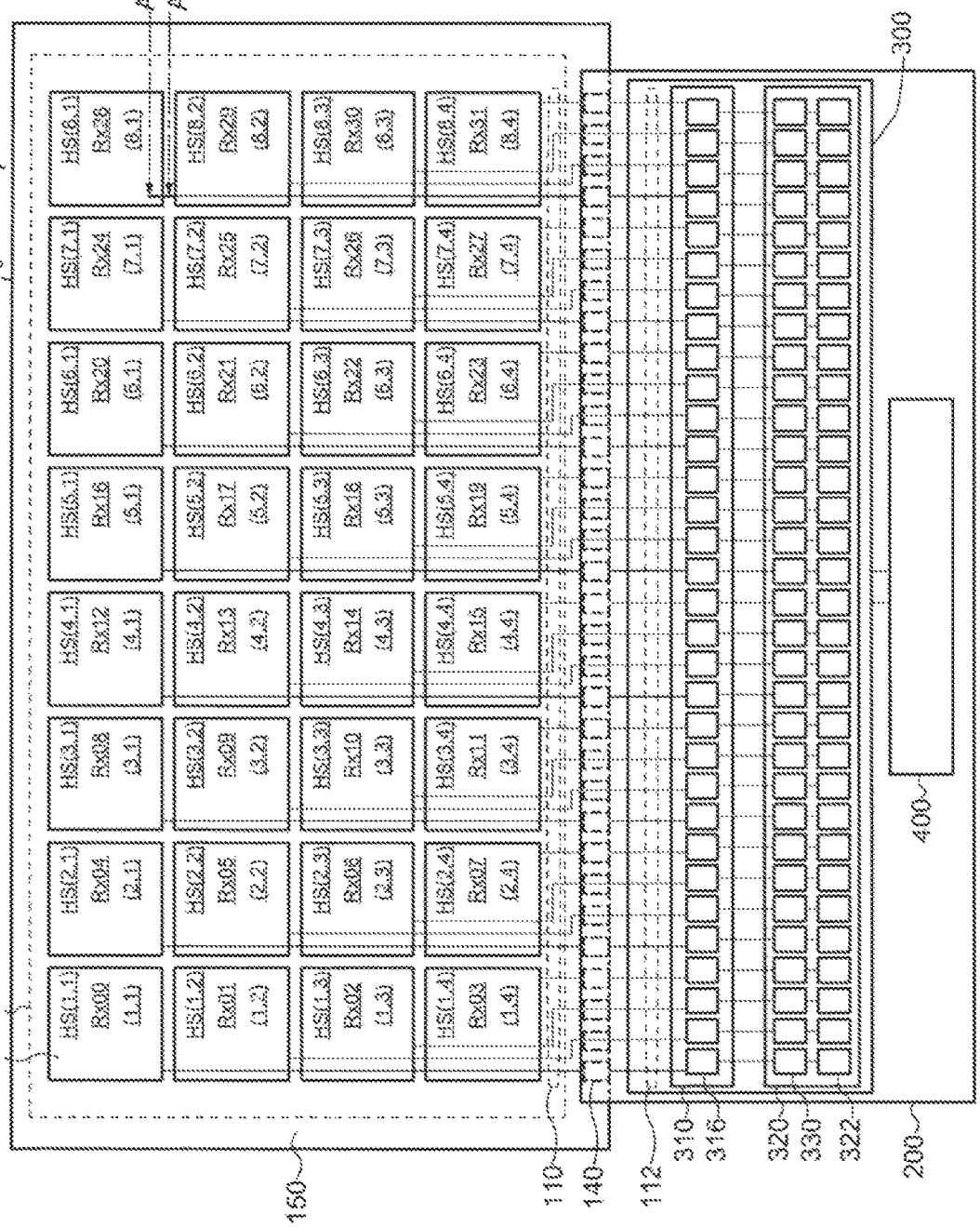
FIG. 1 is a schematic plan view showing a configuration of a sensing device according to an embodiment of the present invention.

FIG. 1 is a schematic plan view showing an embodiment of a sensing device 10.

As shown in FIG. 1, the sensing device 10 includes a sensing panel 100 and a flexible printed circuit board 200. The sensing panel 100 includes a substrate 20, a proximity sensor unit 120 on the substrate 20, and a peripheral area 150 surrounding the proximity sensor unit 120.

A plurality of proximity sensors HS having a sensing electrode 130 is arranged in the proximity sensor unit 120. The plurality of proximity sensors HS is arranged in a matrix in a left-right direction (row direction, direction X) and a vertical direction (column direction, direction Y). Each of the plurality of sensing electrodes 130 is electrically connected to a terminal 140 using a wiring 110. Each of the plurality of sensing electrodes 130 is electrically connected to a sensing circuit 300 using a wiring 112 included in the terminal 140 and the flexible printed circuit board 200.

In addition, each sensing electrode 130 may be connected to a plurality of wirings 110 from the viewpoint of redundancy. However, when one sensing electrode 130 is connected to the plurality of wirings 110, the plurality of wirings is constantly supplied with the same signal.

The flexible printed circuit board 200 is electrically connected to the sensing panel 100 via a plurality of terminals 140. The sensing circuit 300 and an arithmetic circuit 400 are arranged on the flexible printed circuit board 200. For example, the sensing circuit 300 and the arithmetic circuit 400 are electrically connected to the flexible printed circuit board 200 by a COF (Chip on Film) method.

In addition, the sensing circuit 300 and the arithmetic circuit 400 may be arranged on another circuit substrate connected to the flexible printed circuit board 200.

M×n sensing electrodes 130 are arranged in m columns and n rows in the embodiment shown in FIG. 1. The coefficient m and the coefficient n are positive integers. In addition, each of the plurality of sensing electrodes 130 is represented by the sensing electrode (m, n), where (m, n) are the coordinates of each of the plurality of sensing electrodes 130. For convenience, it is assumed that the sensing electrode 130 at the upper left of FIG. 1 is (1, 1) and the sensing electrode 130 at the lower right is (m, n) (in the present embodiment, m=8, n=4).

The sensing circuit 300 includes a sensing signal amplifier circuit 310 and an AD converter circuit 320. The sensing signal amplifier circuit 310 has at least the same number of amplifier circuit units 316 as the sensing electrode 130, and each amplifier circuit unit 316 is connected to the wiring 110 one-to-one. The AD converter circuit 320 includes the same number of AD converters 322 and signal processing circuits 330 as the sensing electrode 130. Each AD converter 322 is connected to an output of the amplifier circuit unit 316 one-to-one, and the signal processing circuit 330 and an output of the AD converter 322 are connected one-to-one. In addition, an output of the signal processing circuit is connected to the arithmetic circuit 400 via one or a plurality of wirings.

For example, the circuit unit including the amplifier circuit unit 316 and the AD converter 322 may be referred to as an Analog Front End (AFE). The sensing circuit 300 has the same number of AFEs as the sensing electrode 130, and they are connected one-to-one via the wiring 110.

<1-2. Embodiment of Detection of Voltage Change in Self-Capacitance Method>

Figure 2:
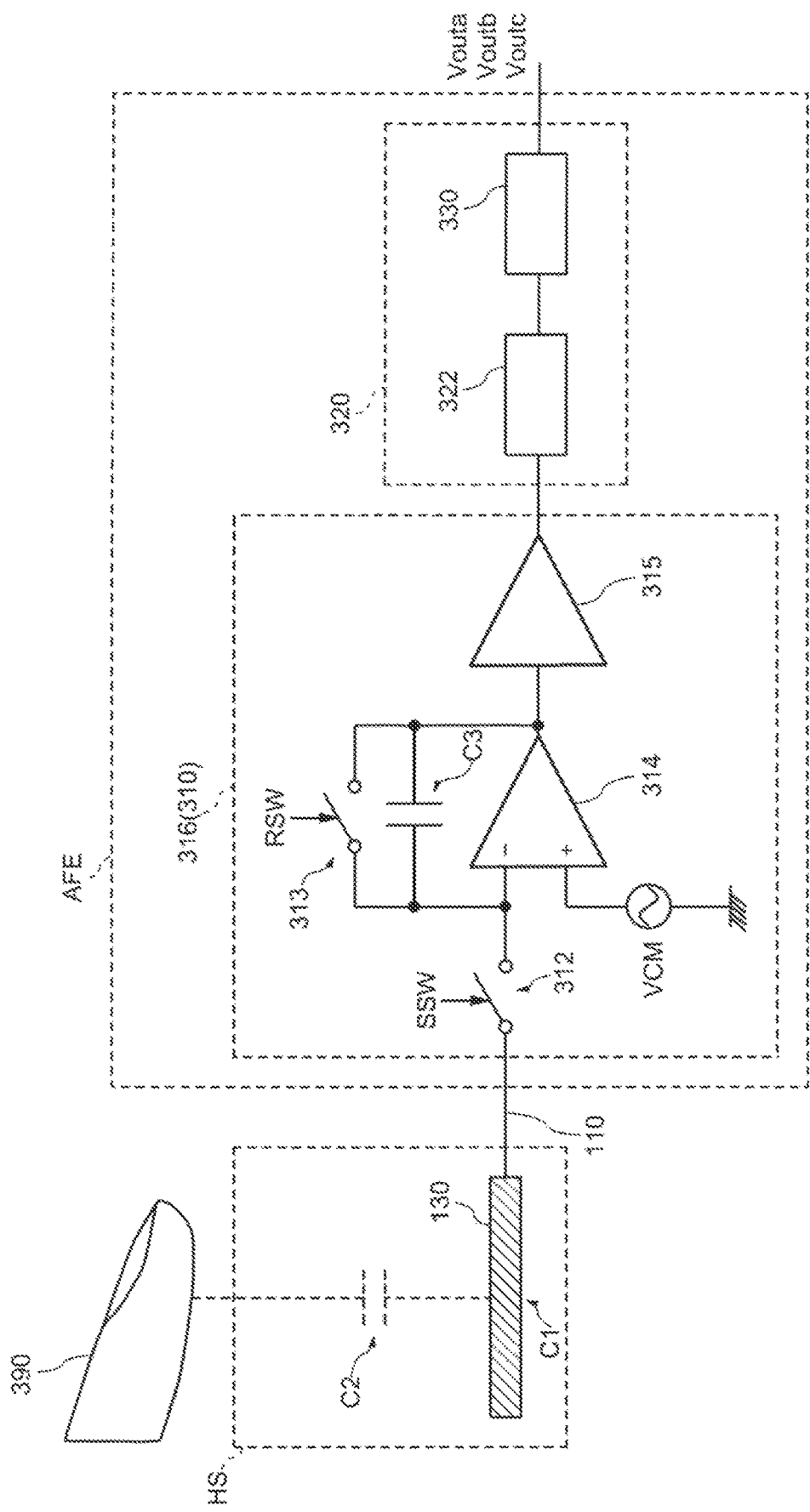
FIG. 2 is a diagram for explaining an example of the detection of a voltage change in the self-capacitance method.

FIG. 2 is a circuit diagram conceptually showing the sensing electrode 130 and a circuit configuration around the AFE connected to the sensing electrode 130.

As shown in FIG. 2, the sensing electrode 130 is connected to an input unit of the AFE via the wiring 110. In addition, the sensing electrode 130 has an inherent capacitance (parasitic capacitance C1) in relation to surrounding electrodes or the like. The AFE has a first analog amplifier 314, and an inverting terminal of the first analog amplifier 314 is connected to the sensing electrode via a switch 312 and the wiring 110. In addition, a drive signal VCM or a predetermined fixed potential (Low potential) is input to a non-inverting input terminal of the first analog amplifier 314. The fixed potential may be a predetermined constant potential or a ground potential (GND). In addition, a back follower capacitor C3 and a reset switch 313 are arranged in parallel between the output terminal side and the inverting input terminal side of the first analog amplifier 314, and a negative feedback circuit is formed. In addition, an output of the first analog amplifier 314 is connected to an input of a second analog amplifier 315. An output of the second analog amplifier 315 is electrically connected between the AD converters 322 included in the AD converter circuit 320. For example, the first analog amplifier 314 is a comparator circuit and the second analog amplifier 315 is an amplifier circuit, in the present embodiment. However, the configuration and the function of the first analog amplifier 314 and the second analog amplifier 315 are not limited to the configuration and the function shown here as long as they have the configuration and the function of amplifying an input signal.

Figure 3:
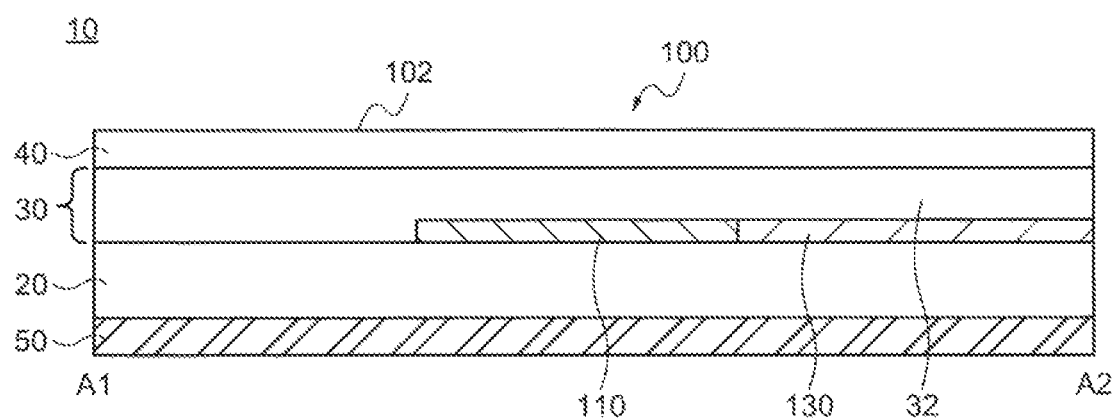
FIG. 3 is a schematic cross-sectional view of a sensing panel according to an embodiment of the present invention.

FIG. 3 is a schematic cross-sectional view of the sensing panel 100, which is a cross-sectional view of an area indicated by A1 and A2 shown in FIG. 1. As shown in FIG. 3, the sensing panel 100 includes the substrate 20, a sensing electrode layer 30, a protective film 32, a cover layer 40, and a shield electrode 50.

The sensing electrode layer 30 includes the plurality of wirings 110 and the sensing electrode 130 electrically connected to the wirings 110. The wiring 110 and the sensing electrode 130 are arranged on the substrate 20 in the same layer.

Although the sensing electrode layer 30 may be formed of a single layer of a transparent conductive film such as an ITO, it may also be formed by stacking a metal layer made of mesh or the like on the transparent conductive film. In addition, the sensing electrode layer 30 can be formed only of a metal layer made of mesh or the like. Further, the term "metal layer" as used herein includes not only a configuration composed of a single layer of a single metal or an alloy composed of a plurality of metals but also a configuration obtained by stacking a plurality of such metal films.

The protective film 32 is arranged over the entire surface of the substrate except for the upper surface of the terminal 140, and covers the wiring 110 and the sensing electrode 130. Further, the protective film 32 includes one layer or a plurality of layers of an inorganic film and may include a structure in which one layer or a plurality of layers of an organic film and one layer or a plurality of layers of these organic films and inorganic films are stacked.

The cover layer 40 is arranged on the protective film 32. The cover layer protects the sensing electrode layer 30. For example, the cover layer 40 is a cover glass or a film or thin plate made of a transparent resin. For example, the cover layer 40 and the sensing electrode layer 30 are bonded by a transparent adhesive layer (not shown) arranged therebetween.

The shield electrode 50 is arranged on a surface of the substrate 20 opposite to the surface on which the sensing electrode layer 30 is arranged and is arranged over at least the proximity sensor unit 120 and the peripheral area 150 including the proximity sensor unit 120. The shield electrode 50 is electrically connected to the sensing circuit 300 and receives a shield signal having a predetermined voltage from the sensing circuit 300. The shield electrode 50 shields an unintended signal, an electric field, or the like from the outside of the sensing device 10.

Although details will be described later, the sensing device 10 may be a contact-type sensing device for specifying the position of a sensing object 390 when the sensing object 390 contacts a detection surface 102 of the sensing device 10, and may be a so-called hover detection (proximity detection/non-contact-type detection) sensing device for sensing the proximity state of the sensing object 390 even in a state where the sensing object 390 does not touch the detection surface 102.

1-3. Functional Configuration of Sensing Device 10

Figure 4:
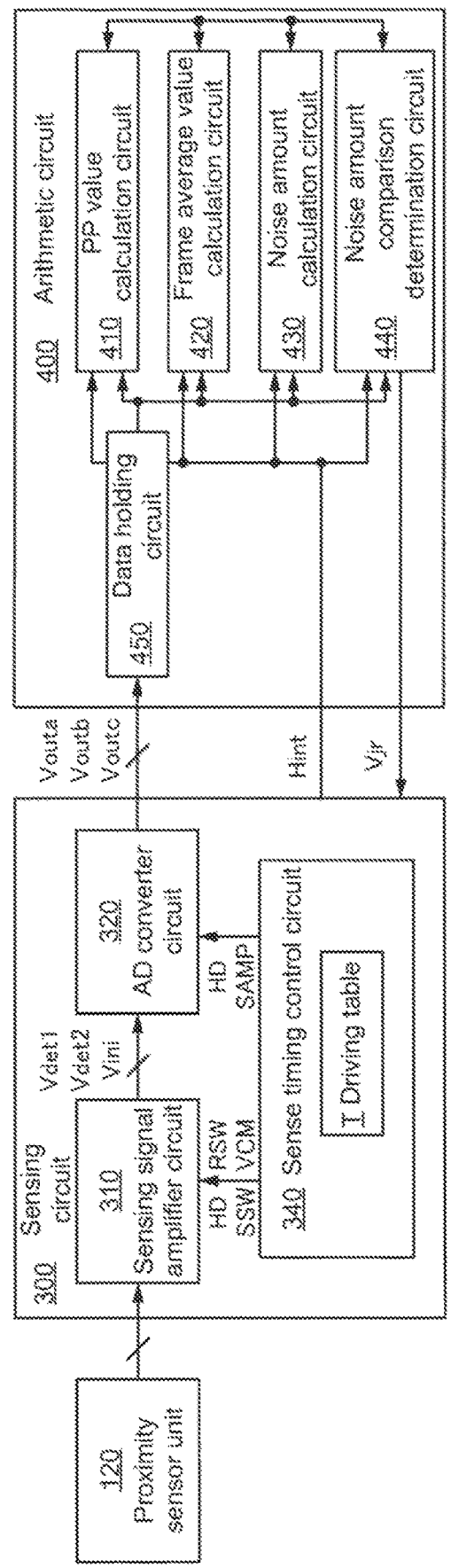
FIG. 4 is a block diagram showing a functional configuration of a sensing device according to an embodiment of the present invention.

A functional configuration of the sensing device 10 will be described with reference to FIG. 2 and FIG. 4. FIG. 4 is a block diagram showing a functional configuration of the sensing device 10. The configuration of the sensing device 10 shown in FIG. 4 is an example, and the configuration of the sensing device 10 is not limited to the configuration shown in FIG. 4. Descriptions of the same or similar configurations as those in FIG. 1 to FIG. 3 will be omitted.

The sensing device 10 is a self-capacitance type capacitive sensing device. More specifically, the sensing device 10 supplies the drive signal VCM to the plurality of sensing electrodes 130 to generate a capacitance C2 between the sensing object 390 (for example, a user's finger) and the sensing electrode and detects a change in the capacitance C2 to sense the position of the sensing object 390. In addition, the sensing device 10 of the present embodiment performs a hover detection operation (proximity detection/non-contact-type detection) for sensing the position of the sensing object 390 in a state where the sensing object 390 is separated from the sensing electrode 130 (the cover layer 40). In this case, location information of the sensing object 390 is not only two-dimensional information (planar location information) on the proximity sensor unit 120, but also three-dimensional information (planar location information and height information) including a distance from the proximity sensor unit 120. The location information of the sensing object 390 in a state in which the sensing object 390 is near the proximity sensor unit 120 (the cover layer 40) so as to be in contact or nearly in contact is only planar location information without height information.

The sensing device 10 of the present embodiment that performs the hover detection operation has three drive modes (MODE). The three drive modes are a baseline scan, a noise scan, and a signal scan.

The baseline scan is a scan for sequentially or simultaneously inputting an initial drive signal to the plurality of sensing electrodes 130 and outputting an initial signal Vini from the amplifier circuit unit 316.

The noise scan is a scan for outputting a sensing signal Vdet1 from the amplifier circuit unit 316 when a predetermined fixed potential is input to the plurality of sensing electrodes 130.

The signal scanning is a scan for outputting a sensing signal Vdet2 from the amplifier circuit unit 316 when sequentially or simultaneously inputting a predetermined drive signal to the plurality of sensing electrodes 130.

For example, the initial signal Vini, a plurality of sensing signals Vdet1, and a plurality of sensing signals Vdet2 are analog signals (analog data). Since the initial drive signal of the baseline scan is equal to a drive signal of the signal scan, these signals will be described simply as the drive signal VCM, in the following description. Although the drive signal VCM is described as an AC square wave with a predetermined period and amplitude, an AC wave that is not a square wave (pulsed wave) may also be adopted, in the following description.

Each of a plurality of initial output signals Vouta, a plurality of output signals Voutb, and a plurality of output signals Voutc is referred to as low data (RawData), in the present embodiment.

The noise entering the sensing electrode 130 through the sensing object may be referred to as, for example, charger noise. The charger noise has various frequencies, and may have a frequency of the drive signal VCM supplied to each sensing electrode 130 and a sampling frequency that is supplied to a read-out circuit (AFE) for sampling the sensing signal, or a frequency that is approximated to an integral multiple of these frequencies.

In this case, the capacitance formed between the sensing electrode 130 and the sensing object 390 may change due to the mixing of the charger noise, making it impossible to obtain the desired sensing signal. In addition, if the above-described charger noise is mixed into the capacitance detection according to the sensing electrode 130 and the sensing object 390, it is difficult to determine the noise or to distinguish between the noise and the desired sensing signal.

The sensing device 10 prepares a plurality of sets of combinations of drive signals and sampling signals having the same frequency at different frequencies, executes the noise scan by driving different proximity sensors HS at the plurality of sets of frequencies, and then executes a signal scan by driving all the proximity sensors HS at one frequency in the plurality of sets, in the present embodiment. The sensing device 10 calculates the noise amount sensed by each of the plurality of sensing electrodes 130 using the data obtained by executing the baseline scan, the data obtained by executing the noise scan, and the data obtained by executing the signal scan. The sensing device 10 detects the presence or absence of noise (charger noise) in relation to the frequency in the signal scan based on the sensed noise amount, and changes the frequency of the signal scan as necessary (frequency hopping).

Hereinafter, the configuration of the sensing circuit for executing the detection method and the driving of the sensing device will be described in detail.

1-3-1. Functional Configuration of Sensing Circuit 300

Figure 5:
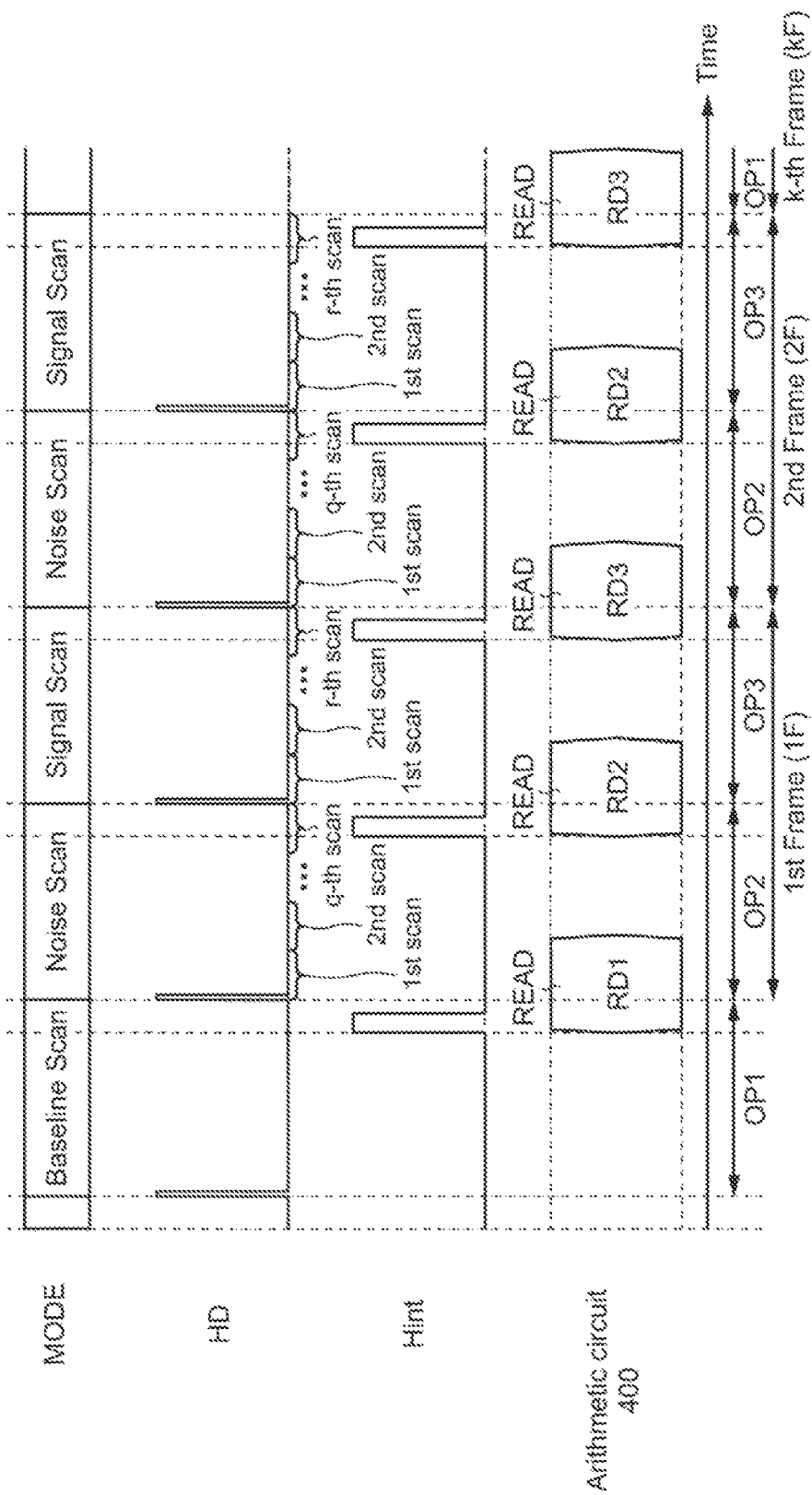
FIG. 5 is a timing chart for explaining a driving method of a sensing device according to an embodiment of the present invention.

The functional configuration of the sensing circuit 300 will be described with reference to FIG. 2 and FIG. 4 to FIG. 6. FIG. 5 is a timing chart for explaining a driving method of the sensing device 10. Descriptions of the same or similar configurations as those in FIG. 1 to FIG. 4 will be omitted.

As shown in FIG. 4, the sensing circuit 300 includes the sensing signal amplifier circuit 310, the AD converter circuit 320, and a sense timing control circuit 340. The sensing signal amplifier circuit 310 and the AD converter circuit may be collectively referred to as the read-out circuit (AFE), and the sense timing control circuit 340 may be referred to as the control circuit.

The sensing signal amplifier circuit 310 includes at least the same number of amplifier circuit units 316 as the number of proximity sensors HS, and each amplifier circuit unit 316 outputs a plurality of initial signal Vini, the plurality of sensing signals Vdet1, and the plurality of sensing signals Vdet2 based on the drive signal VCM to be input and the capacitance formed by the connected sensing electrode 130.

The AD converter circuit 320 includes at least the same number of AD converters 322 and signal processing circuits 330 as the number of proximity sensors HS. Each AD converter 322 has a function of sampling each of a plurality of analog signals serially supplied from each amplifier circuit 316 of the sensing signal amplifier circuit 310 according to an intervention of a sampling control signal SAMP, and converting each of a plurality of sampled analog signals into a digital signal. The AD converter 322 serially supplies the digital signal to the signal processing circuit 330.

For example, the signal processing circuit 330 includes a memory device such as a digital signal processor (DSP), volatile memory, and non-volatile memory. For example, the digital signal processor includes a multiplier and an adder. The signal processing circuit 330 accumulates and arithmetically processes digital signals sequentially output from the AD converter circuit 320, and outputs them as the initial output signal Vouta, the output signal Voutb, and the output signal Voutc to the arithmetic circuit 400 according to the type of scanning.

For example, the arithmetic processing in the signal processing circuit includes a process of calculating the difference of the even-numbered digital signal from the odd-numbered digital signal adjacent to each other using the digital signal serially output from each AD converter circuit 320 and calculating the average value of the digital signal in the period by dividing the difference by the total number of digital signals, and outputting the average value as the output signal Vout.

The output signal is output from the sensing circuit 300 to the arithmetic circuit 400 after the end of each scan period. More specifically, the sensing device 10 of the present embodiment has a baseline scan period, a noise scan period, and a signal scan period, and these are executed in a time-division manner. For example, as shown in FIG. 5, the baseline scan period is arranged first, and after that, the noise scan period and the signal scan period are alternately arranged a plurality of times, in the sensing device 10 of the present embodiment. Each scan in each scan period is executed a plurality of times for each proximity sensor HS according to a drive frequency (sampling frequency), and the plurality of digital signals is integrated into the signal processing circuit 330. The signal processing circuit 330 generates the output signal Vout based on the integrated digital signal, and outputs the output signal Vout to the arithmetic circuit 400 after the end of the scan period.

Further, the noise scan period and the subsequent signal scan period are collectively referred to as a one frame (1 Frame) period. Although the output signals Voutb and Voutc are output to the arithmetic circuit 400 for each scan period, integrating the output signals Voutb and Voutc over a plurality of frames in the arithmetic circuit 400 is referred to as frame integration of the output signal.

In addition, the output signals Vouta, Voutb, and Voutc are held in a data holding circuit 450 included in the arithmetic circuit 400.

As shown in FIG. 2 or FIG. 4, the sense timing control circuit 340 supplies the control signal to the sensing signal amplifier circuit 310 and the AD converter circuit 320 to control them. More specifically, the sense timing control circuit supplies a connection switch control signal SSW, a reset switch control signal RSW, and the drive signal VCM to each amplifier circuit unit 316 of the sensing signal amplifier circuit 310. In addition, the sense timing control circuit supplies the sampling control signal SAMP to each AD converter 322 of the AD converter circuit 320. The reset switch control signal RSW and the sampling control signal SAMP are synchronized. In addition, the drive signal VCM and the reset switch control signal RSW are also correlated.

Further, the sense timing control circuit 340 has a function of changing the frequency of the reset switch control signal RSW, the sampling control signal SAMP, and the scan control signal (the drive signal VCM). To perform such a function, the sense timing control circuit 340 stores a driving table T for the frequencies of the drive signal VCM and the sampling control signal SAMP in the memory. The sense timing control circuit 340 has a function of supplying a control signal Hint to the arithmetic circuit 400 and controlling the arithmetic circuit 400.

FIG. 6 shows an example of the driving table T. The driving table T is a look up table (LUT) in which a plurality of drive conditions (tables) for executing each scan of the sensing device 10 is stored. The driving table T has a plurality of tables, and each table has a frequency (drive frequency) of the drive signal VCM supplied to the amplifier circuit unit 316, the reset switch control signal RSW for operating the reset switch 313 of the amplifier circuit unit 316, and a frequency (sampling frequency) of the sampling control signal SAMP for instructing sampling in the AD converter 322. For example, the sense timing control circuit 340 reads out a program from the memory, and reads out the drive condition (each frequency) from the driving table T based on the read out program. The sense timing control circuit 340 executes each scan using the drive condition.

As shown in FIG. 6, the sensing device 10 includes four drive conditions of the noise scan and four drive conditions of the signal scan as an example. Also, the same drive condition as the signal scan is used for the baseline scan.

The noise scan includes four driving tables: a table TA (table A), a table TB (table B), a table TC (table C), and a table TD (table D).

The signal scan includes four driving tables: a table TE (table E), a table TF (table F), a table TG (table G), and a table TH (table H).

The tables TA to TD of the noise scan are supplied with a predetermined fixed potential such as GND to the amplifier circuit unit 316, so there is no specific drive frequency (in FIG. 6, the drive frequency is shown as Low fixed). In addition, each sampling frequency of the tables TA to TD is FA, FB, FC, and FD, and these are different frequencies. The sampling frequency FA in the present embodiment is the smallest and increases in the order of the FB, FC, and FD.

In addition, the drive frequency and the sampling frequency in the table TE of the signal scan are as same as the sampling frequency FA, which is the same as the sampling frequency of the table TA of the noise scan. Similarly, the drive frequency and the sampling frequency of each table TF to TH are as same as the sampling frequency FB, FC and FD respectively, and these correspond to the sampling frequency FB, FC, and FD in each table TB, TC, and TD of the noise scan. For example, these frequencies are several kHz or more and several hundred kHz or less.

1-3-2. Functional Configuration of Arithmetic Circuit 400

The functional configuration of the arithmetic circuit 400 will be described with reference to FIG. 4. The arithmetic circuit 400 includes the data holding circuit 450, a PP (peak-to-peak) value calculation circuit 410, a frame average value calculation circuit 420, a noise amount calculation circuit 430, and a noise amount comparison determination circuit 440.

The number of integrated frames is the number obtained by integrating the number of signal scans repeatedly executed within one frame in a plurality of frames, in the present embodiment.

For example, the PP value calculation circuit 410 receives the output signal Voutb from the data holding circuit 450. For example, the PP value calculation circuit 410 integrates the output signal Voutb for a predetermined number of frames for each proximity sensor HS, performs a Peak-Peak calculation by using the integrated output signal Voutb, that is, calculates a difference between the maximum value and the minimum value of the output signal Voutb integrated for each proximity sensor HS, and stores the calculated value as a PP value for each proximity sensor HS. In addition, the PP value calculation circuit 410 transmits the PP value to the noise amount calculation circuit 430 and the noise amount comparison determination circuit 440.

For example, the frame average value calculation circuit 420 stores the output signal Vouta for each proximity sensor HS. In addition, for example, the frame average value calculation circuit 420 receives the output signal Voutc from the data holding circuit 450, integrates the output signal Voutc for a predetermined number of frames (for example, 10 frames) for each proximity sensor HS (frame integration), calculates an average value of the output signal Voutc by dividing the integrated data by the number of frames, calculates a difference between the average value and the output signal Vouta, and stores the calculated value as an average value AVE for each proximity sensor. In addition, the frame average value calculation circuit 420 transmits the average value AVE to the noise amount calculation circuit 430 and the noise amount comparison determination circuit 440.

Further, the calculation in the frame average value calculation circuit 420 may be configured to calculate the average value AVE by calculating the difference in the output signal Vouta with respect to the output signal Voutc, integrating and averaging the calculated value.

The noise amount calculation circuit 430 receives the PP values and the average values AVE of each proximity sensor from the PP value calculation circuit 410 and the frame average value calculation circuit 420. The noise amount calculation circuit 430 performs a calculation of dividing the PP value by the average value AVE for each proximity sensor, and calculates (generates) a noise amount N (FIG. 22) from the calculation. The noise amount calculation circuit 430 transmits the generated noise amount N to the noise amount comparison determination circuit 440.

The noise amount comparison determination circuit 440 determines a noise amount for each proximity sensor HS by using the generated noise amount N, and specifies a proximity sensor HS having a sensing signal which is considered to contain noise. The noise amount comparison determination circuit 440 transmits the presence or absence of the proximity sensor HS determined to be noise mixed and the position of the proximity sensor HS to the sensing circuit 300 as a determination result Vjr.

The sensing circuit 300 determines whether the drive frequency and the sampling frequency of the signal scan can be changed based on the determination result Vjr, and when it is determined that they can be changed, changes the drive frequency and the sampling frequency of the signal scan based on the driving table T (frequency hopping).

As described above, the sensing device 10 of the present embodiment has the three drive modes (MODE). The three drive modes are the baseline scan, the noise scan, and the signal scan described above. Each drive in one proximity sensor HS will be described in detail below. Further, it is assumed that the baseline scan and the signal scan are executed based on the table TE, and the noise scan is executed based on the table TA, in the following explanation.

The drive signal VCM of an FA drive frequency is supplied to the first analog amplifier 314, and the reset switch control signal RSW having the same drive frequency FA is supplied to the reset switch 313, in the baseline scan. That is, the amplifier circuit unit 316 is driven by the drive frequency FA. In addition, the sampling control signal SAMP of the sampling frequency FA is supplied to the AD converter 322, and the AD converter 322 executes the sampling of the analog signal Vini output from the amplifier circuit unit 316 based on the sampling frequency FA. That is, the drive signal VCM, the reset switch control signal RSW, and the sampling control signal SAMP are synchronously driven at the drive frequency FA, and the digital signal output from the AD converter 322 is serially accumulated in the signal processing circuit 330 until the baseline scan period ends.

The base line scan driving is performed in a state in which there is no sensing object 390. A high (High, H) voltage is supplied to the reset switch control signal RSW when the drive signal VCM is at a low (Low, L) voltage, whereby the switch 113 is turned on, the input terminal and the output terminal of the first analog amplifier 314 become conductive, and the amplifier circuit unit is reset. In this case, the charges charged in a capacitance C3 are discharged. In addition, a low voltage is supplied to the reset switch control signal RSW when the drive signal VCM is at a high voltage, whereby the switch is turned off, the input terminal and the output terminal of the first analog amplifier 314 become non-conductive, charges corresponding to the capacitance C1 of the sensing electrode 130 are charged in the back follower capacitor C3, and a potential corresponding to the capacitance of the back follower capacitor C3 is output from the first analog amplifier 314. The output signal is amplified by the second analog amplifier 315 to become the analog signal Vini, and supplied to the AD converter circuit 320. In this case, a high-voltage sampling control signal SAMP is supplied, and the analog signal Vini is sampled by the AD converter circuit 320 and converted into a digital signal. The digital signal is accumulated in units of frames in the signal processing circuit and subjected to arithmetic processing, and then output to the arithmetic circuit 400 as Vouta.

Further, at the time of the base line scan driving, a drive signal VCM the same as the drive signal VCM supplied to the proximity sensor HS is supplied to the shield electrode 50.

The plurality of proximity sensors HS is driven based on the table TA in the noise scan. Although the drive basically performs the same drive as the baseline scan, the sampling control signal SAMP has a predetermined drive frequency FA, while the drive signal VCM and the reset switch control signal RSW are predetermined fixed potentials (Low fixed). In addition, driving the amplifier circuit unit 316 and the AD converter 322 based on such a signal makes the amplifier circuit unit 316 output an analog signal Vdet1, and the analog signal Vdet1 is sampled at the drive frequency FA and converted into a digital signal in an AD converter 422. The digital signal is accumulated in units of frames in the signal processing circuit 330 and subjected to arithmetic processing, and then output to the arithmetic circuit 400 as Voutb.

Further, at the time of the noise scan driving, a predetermined fixed potential is supplied to the shield electrode 50 as in the case of the proximity sensor HS.

The same driving as in the baseline scan is performed in the signal scan. That is, the reset switch control signal RSW and the sampling control signal SAMP have the drive frequency FA, and the scan control signal (the drive signal VCM) also has the drive frequency FA. In addition, the output from the amplifier circuit unit 316 is an analog signal Vdet2, and the analog signal Vdet2 is sampled at the drive frequency FA and converted into a digital signal in the AD converter 322, in the signal scan. The digital signal is accumulated in units of frames in the signal processing circuit 330 and subjected to arithmetic processing, and then output to the arithmetic circuit 400 as Voutc.

Further, at the time of the signal scan line driving, the same drive signal VCM as the drive signal VCM supplied to the proximity sensor HS is supplied to the shield electrode 50.

Although the baseline scan is performed in a state in which the sensing object 390 is not positioned on the detection surface 102 (for example, immediately after the sensing device 10 is activated), and the like, the noise scan and the signal scan are performed in a time-division manner regardless of the presence or absence of the sensing object 390. In the case where the sensing object 390 is present during the scanning, the capacitance C2 is formed between the sensing electrode 130 and the sensing object 390, thereby changing each of the sensing signals Vdet1 and Vdet2.

1-4. Driving Method of Sensing Device 10

Figure 7:
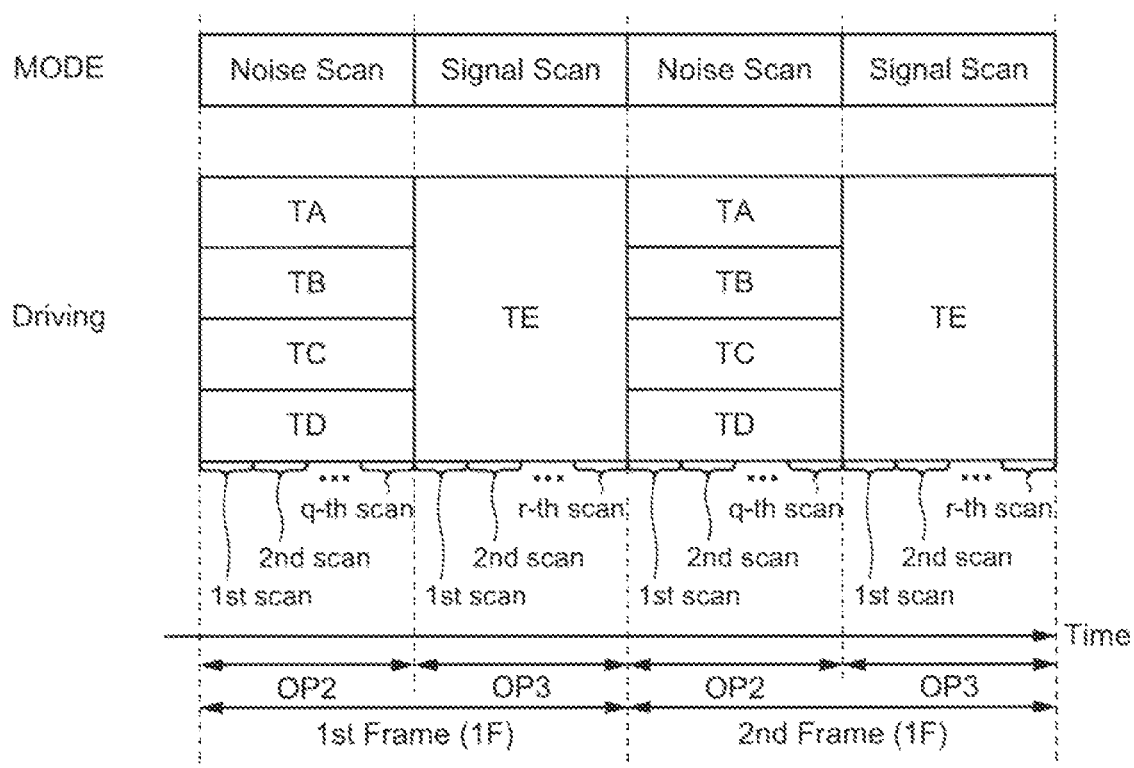
FIG. 7 is a timing chart for explaining a driving method of a sensing device according to an embodiment of the present invention.
Figure 10:
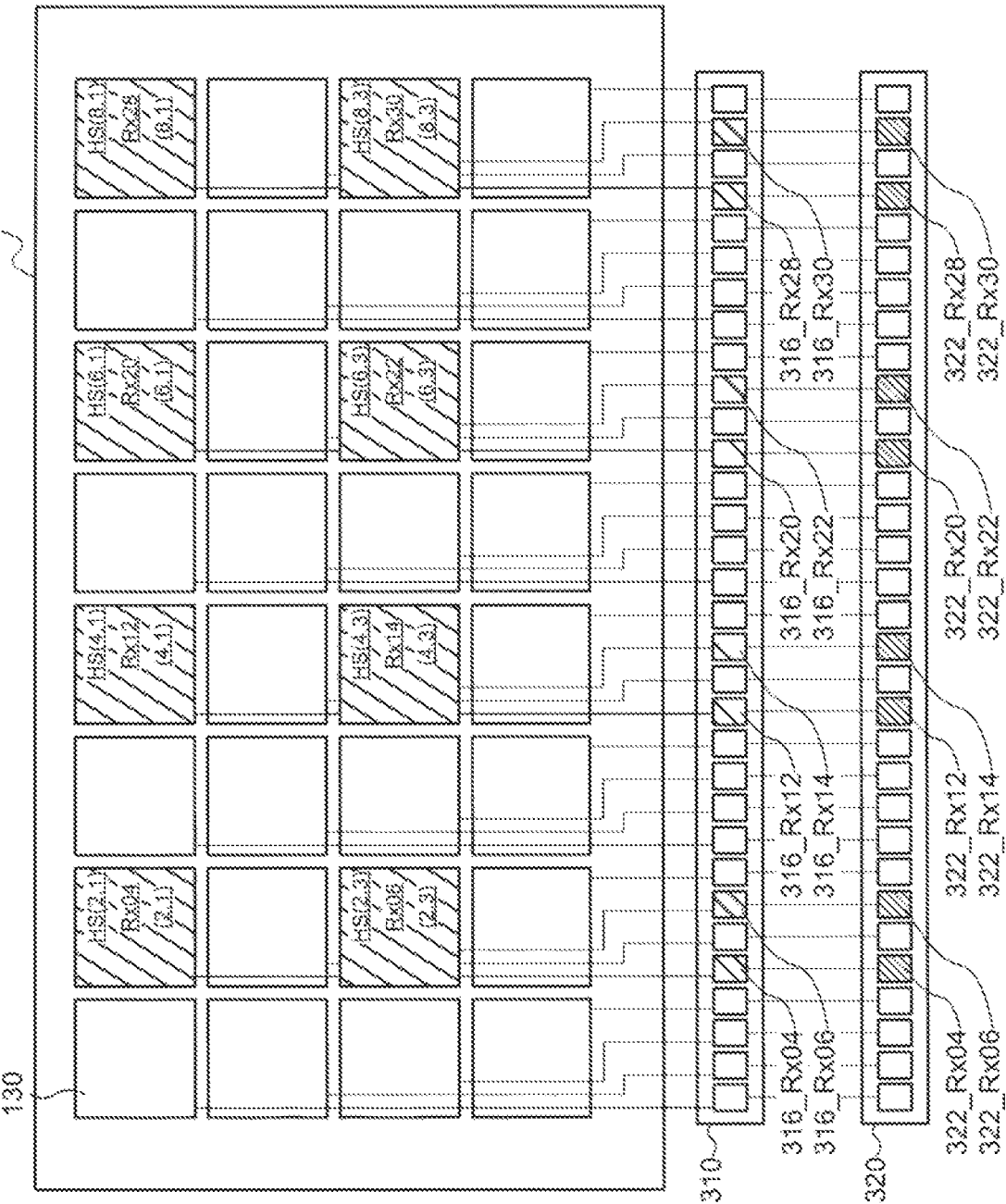
FIG. 10 is a schematic plan view showing a configuration of a sensing electrode and a sensing circuit for explaining a table TC (TABLE C (TC)) drive among the driving methods of a sensing device according to an embodiment of the present invention.
Figure 11:
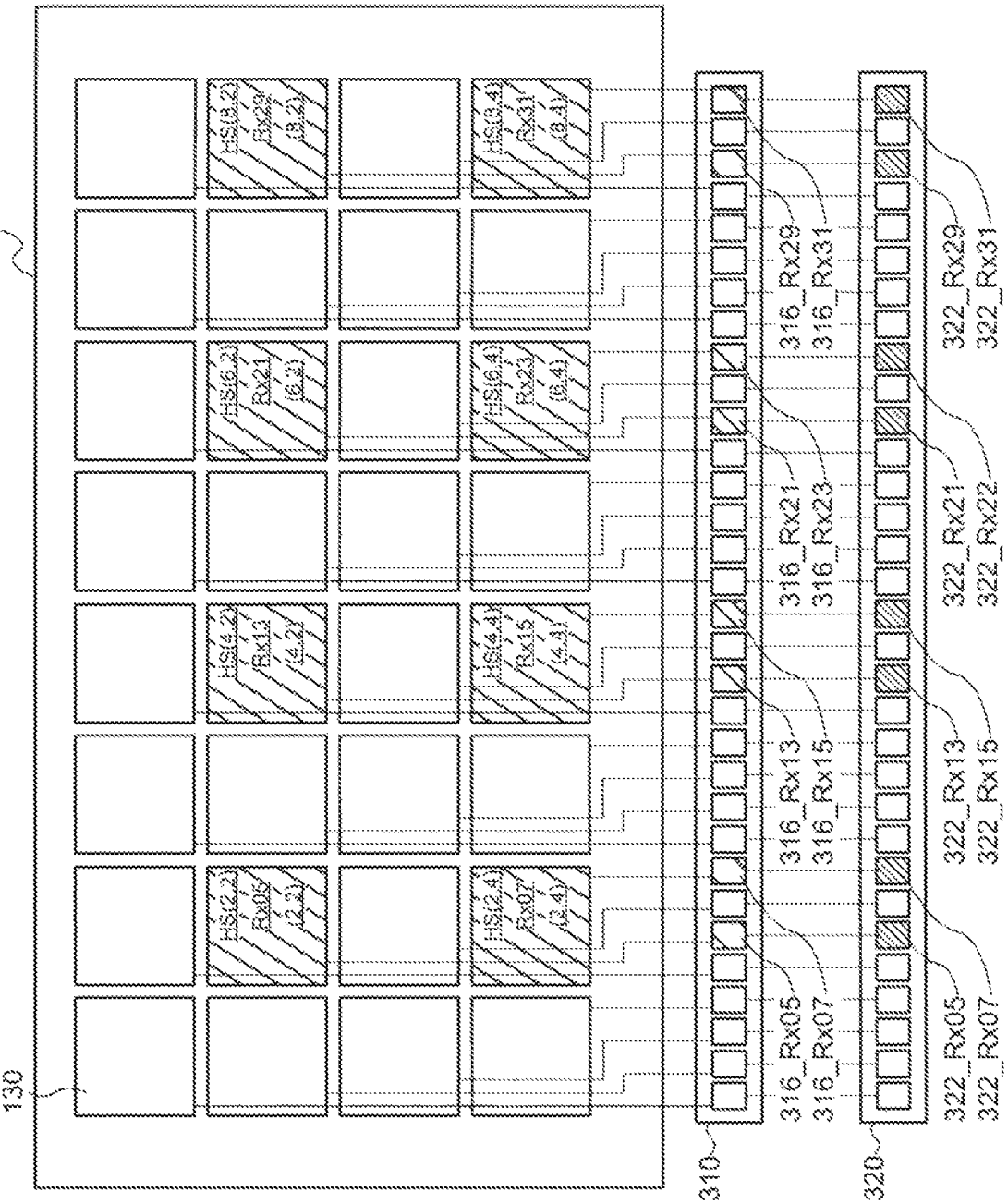
FIG. 11 is a schematic plan view showing a configuration of a sensing electrode and a sensing circuit for explaining a table TD (TABLE D (TD)) drive among the driving methods of a sensing device according to an embodiment of the present invention.
Figure 12:
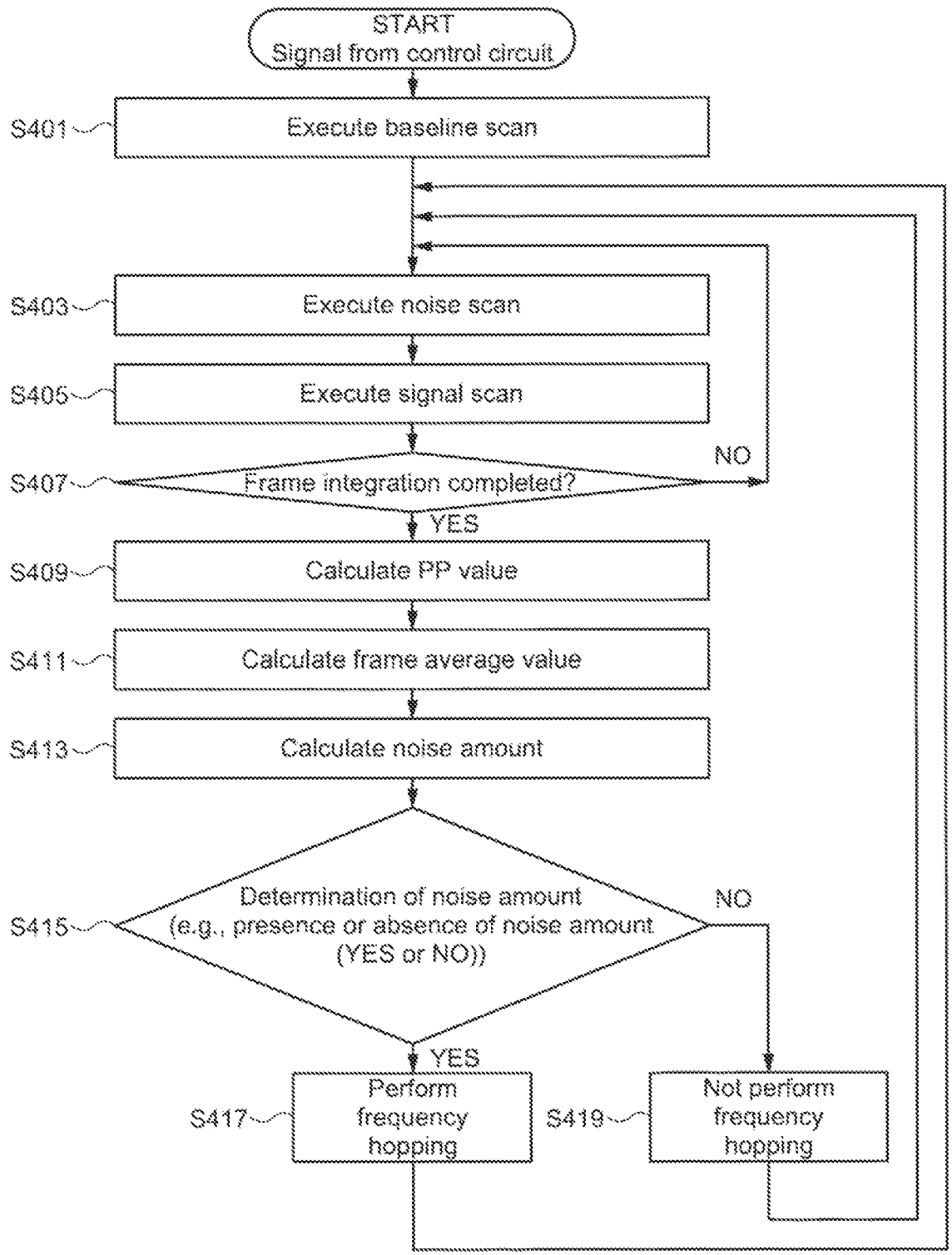
FIG. 12 is a flowchart for explaining a driving method of a sensing device according to an embodiment of the present invention.

A method of driving the sensing device 10 will be described with reference to FIG. 5 to FIG. 23. FIG. 7 is a timing chart for explaining a driving method of the sensing device 10. Each of FIG. 8 to FIG. 11 is a schematic plan view showing the configuration of the sensing electrode 130 and the sensing circuit 300 for explaining the driving of the table TA, the driving of the table TB, the driving of the table TC, the driving of the table TD, and the driving of the tables TE to TH, in the driving method of the sensing device 10. FIG. 12 is a flowchart for explaining the driving method of the sensing device 10. FIG. 13 to FIG. 18 are timing charts for explaining the driving of the tables TA to TD, the driving of the table TE, the driving of the table TF, the driving of the table TG, and the driving of the table TH, in the driving method of the sensing device 10. FIG. 19 to FIG. 23 are diagrams for explaining an example of each step of the driving method of the sensing device 10. The configuration and the driving method of the sensing device 10 shown in FIG. 5 to FIG. 23 are examples, and the configuration and the driving method of the sensing device 10 are not limited to the configurations shown in FIG. 5 to FIG. 23. Descriptions of the same or similar configurations as those in FIG. 1 to FIG. 4 will be omitted.

In the timing chart shown in FIG. 5, the states of the drive modes (MODE), a control signal HD, the control signal Hint, and the arithmetic circuit 400 of the sensing device 10 are shown with respect to time (Time) on the horizontal axis.

The sensing device 10 executes the three drive modes of the baseline scan, the noise scan, and the signal scan in a time-division manner. The baseline scan is executed in an initial setting period OP1, the noise scan is executed in a first sensing period OP2, and the signal scan is executed in a second sensing period OP3. Also, the baseline scan period corresponds to the initial setting period OP1, the noise scan period corresponds to the first sensing period OP2, and the signal scan period corresponds to the second sensing period OP3.

The control signal HD is, for example, a signal that serves as a reference (trigger) for executing each scan. The control signal Hint is a signal that serves as a reference (trigger) for reading out the initial output signal Vouta (for example, first sensed data RD1), the output signal Voutb (for example, second sensed data RD2), and the output signal Voutc (for example, third sensed data RD3) for each sensing electrode 130 stored in the signal processing circuit 330.

When the sensing device 10 starts a proximity sensing operation, first, the baseline scan is executed in the initial setting period OP1. After the baseline scan is executed, the noise scan and the signal scan are alternately executed. The noise scan and the signal scan are repeatedly executed.

The first sensing period OP2 and the second sensing period OP3 are referred to as frame (Frame) periods, e.g., repeated frame periods are referred to as a first frame (1st Frame) period, a second frame (2nd Frame) period, . . . , and a kth frame (k-th Frame) period, in an embodiment of the present invention. The coefficient k is a positive integer. For example, the sensing device 10 executes the proximity sensing operation for k times of frame periods. The frame (Frame) period is executed, for example, at a frequency of 60 Hz or higher and a frequency of 180 Hz or lower, and one frame period is, for example, 5.5 ms or more and 16.6 ms or less. The frame (Frame) period is executed at a frequency of 120 Hz and one frame period is 8.3 ms, in an embodiment of the present invention.

The sensing device 10 executes the baseline scan at a sampling frequency based on the driving table in synchronization with the control signal HD, in the initial setting period OP1. The sensing device 10 may execute, for example, a first scan (1st scan), a second scan (2nd scan), . . . , and a pth scan (p-th scan), i.e., scans p number of times, within the initial setting period OP1 in the baseline scan. The coefficient p is a positive integer.

The sensing device 10 executes the noise scan following the baseline scan at a sampling frequency based on the driving table T in synchronization with the control signal HD, in the first sensing period OP2. The sensing device executes, for example, the first scan (1st scan), the second scan (2nd scan), . . . , and a qth scan (q-th scan), i.e., scans q number of times. The coefficient q is a positive integer, in the noise scan. As will be described later, the number of noise scans in the first sensing period OP2 varies depending on the proximity sensor HS.

The sensing device 10 executes the signal scan following the noise scan at a sampling frequency based on the driving table T in synchronization with the control signal HD, in the second sensing period OP3. The sensing device 10 executes, for example, the first scan (1st scan), the second scan (2nd scan), . . . , and an rth scan (r-th scan), i.e., scans r number of times, within the second sensing period OP3, in the signal scan. The coefficient r is a positive integer.

For example, when the control signal Hint is supplied from the sensing circuit 300, the arithmetic circuit 400 transitions to a read-out state (READ state). The arithmetic circuit 400 reads out the output signal Vout (for example, first sensed data RD0) of each sensing electrode 130 temporarily stored in the memory device included in the signal processor circuit 330 in synchronization with the control signal Hint.

FIG. 7 is a diagram showing an embodiment of a driving table executed in the noise scan and the signal scan in the timing chart shown in FIG. 5.

Figure 8:
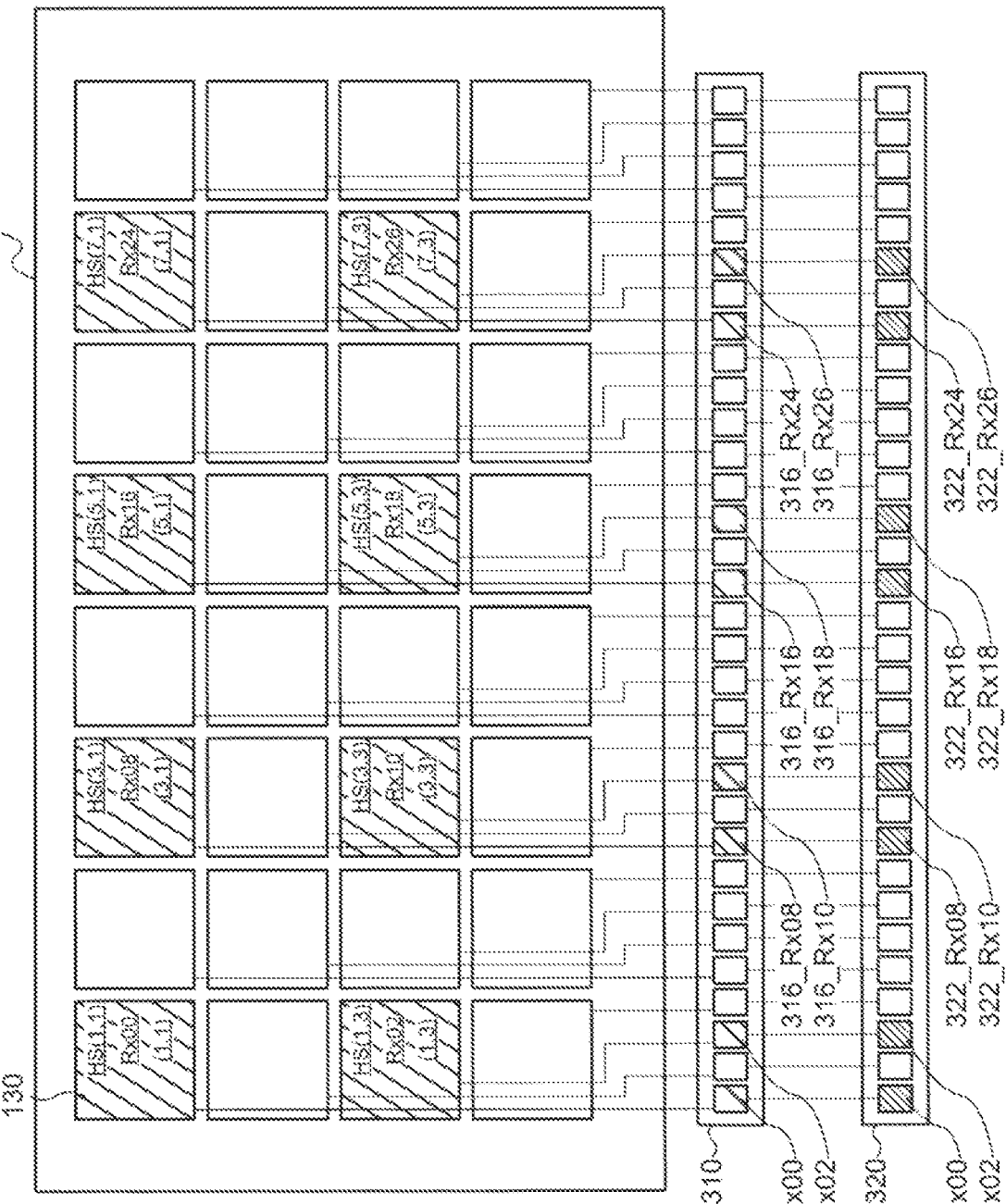
FIG. 8 is a schematic plan view showing a configuration of a sensing electrode and a sensing circuit for explaining a table TA (TABLE A (TA)) drive among the driving methods of a sensing device according to an embodiment of the present invention.
Figure 9:
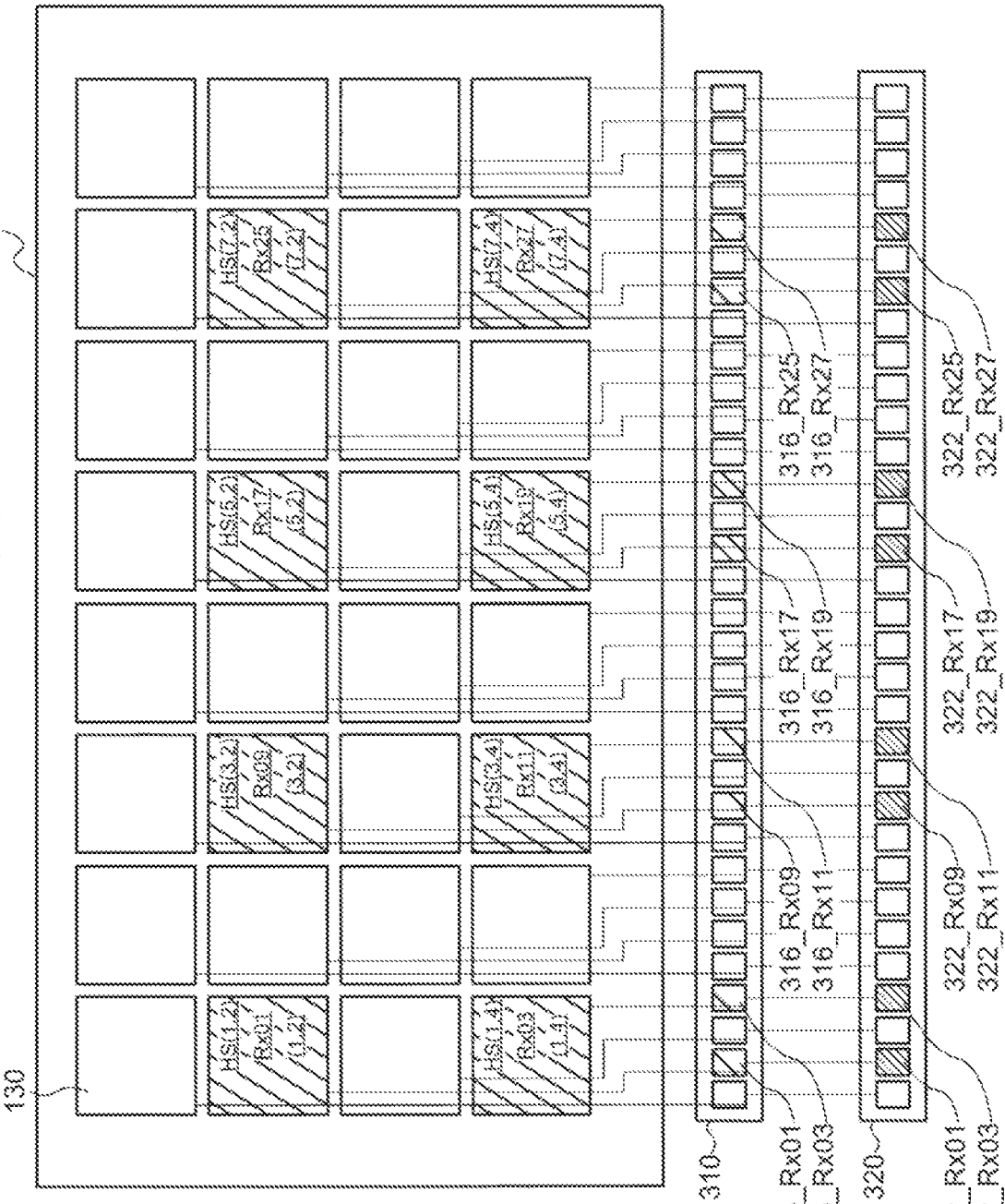
FIG. 9 is a schematic plan view showing a configuration of a sensing electrode and a sensing circuit for explaining a table TB (TABLE B (TB)) drive among the driving methods of a sensing device according to an embodiment of the present invention.

As shown in FIG. 7, for example, driving (first driving to fourth driving) using the table TA to the table TD is executed in parallel in the noise scan period executed in the first sensing period OP2. More specifically, as shown in FIG. 8, the proximity sensor HS corresponding to (2*i*-1, 2*j*-1) among the proximity sensors executes the noise scan based on the table TA. In addition, as shown in FIG. 9, the proximity sensor HS corresponding to (2*i*-1, 2*j*) executes the noise scan based on the table TB during the noise scan. Further, as shown in FIG. 10, the proximity sensor HS corresponding to (2*i*, 2*j*-1) executes the noise scan based on the table TC during the noise scan. In addition, as shown in FIG. 11, the proximity sensor HS corresponding to (2*i*, 2*j*) executes the noise scan based on the table TD during the noise scan. Since the drive frequency and the sampling frequency are different from each other, the number of scans is different for each proximity sensor HS driven in each table.

As shown in FIG. 7, for example, the signal scan based on one table (for example, the table TE) of the table TE to TH is executed for all sensing electrodes in the signal scan period executed in the second sensing period OP3.

The sensing device 10 according to an embodiment of the present invention simultaneously executes the noise scan for four frequencies using four drive frequencies and four sampling frequencies based on the noise scan using the driving of the table TA to TD. In addition, as will be described later, the sensing device 10 according to an embodiment of the present invention executes the signal scan based on one table among the tables TE to TH. The presence or absence of noise in relation to the four drive frequencies is sensed based on the sensing signal obtained in each scan, and the sensing object 390 is sensed.

Further, the configuration of the driving table according to an embodiment of the present invention is an example, and is not limited to the example shown here. For example, in the case where noise for eight frequencies is checked using the driving table based on eight drive frequencies and eight sampling frequencies, the plurality of sensing electrodes 130 is divided into eight groups and controlled by the sense timing control circuit 340 to drive in response to each of the eight driving tables within one frame period.

For example, in the case where noise for eight frequencies is checked using the driving table based on eight drive frequencies and eight sampling frequencies, the plurality of sensing electrodes 130 may be divided into four and controlled by the sense timing control circuit 340 to drive in response to each of the four driving tables among the eight driving tables in a half period of one frame period and drive in response to each of the four driving tables among the remaining eight driving tables in a half period of one frame period.

The sensing device 10 according to an embodiment of the present invention may be configured such that each of the noise scan and the signal scan includes at least two or more driving tables, and the signal sensed by each proximity sensor HS (the sensing electrode 130) can be controlled using different drive frequencies and sampling frequencies.

Hereinafter, an embodiment of a driving method of the sensing device 10 will be described in detail with reference to FIG. 5 and FIG. 8 to FIG. 23. In addition, the baseline scan and the signal scan are performed based on the initial table TE in the following explanation.

1-4-1. Step 401 (S401)

As shown in FIG. 12, when the sensing device 10 starts the proximity sensing operation, the sense timing control circuit 340 in the sensing circuit 300 transmits the control signal HD to each circuit. the sensing device 10 executes the baseline scan in the initial setting period OP1, in step 401 (S401) as shown in FIG. 5. Since the description of the baseline scan is mainly the same as that described with reference to the configurations shown in FIG. 4 to FIG. 7, detailed descriptions thereof will be omitted. In the baseline scan, a scan based on the table TE among the signal scan is executed on all the proximity sensors HS in a non-existence state without the sensing object 390 such as the initial period of the proximity sensing operation. The amplifier circuit unit 316 of each proximity sensor HS generates the initial signal Vini and transmits the generated initial signal Vini to the AD converter 322. The AD converter 322 outputs the digital signal based on the initial signal Vini to the signal processing circuit 330. After the digital signal based on the initial signal Vini is arithmetically processed in the signal processing circuit 330, the signal processing circuit 330 transmits the generated initial output signal Vouta (initial voltage) to the arithmetic circuit 400.

Although the above-described baseline scan is executed based on the table TE over the initial setting period OP1, a configuration in which a plurality of initial setting periods OP1 is continuously arranged, and the scan based on the tables TF, TG, and TH is sequentially executed after the execution of the baseline scan may be adopted. As a result, the initial output signal Vouta based on the baseline scan of each table at the beginning of the detecting operation is stored in the arithmetic circuit 400. In addition, the initial setting period OP1 during which the baseline scan is performed may be arranged at an appropriate interval (for example, at a rate of once in dozens to thousands of frames) as well as at the time of starting up the sensing device.

1-4-2. Step 403 (S403)

Figure 13:
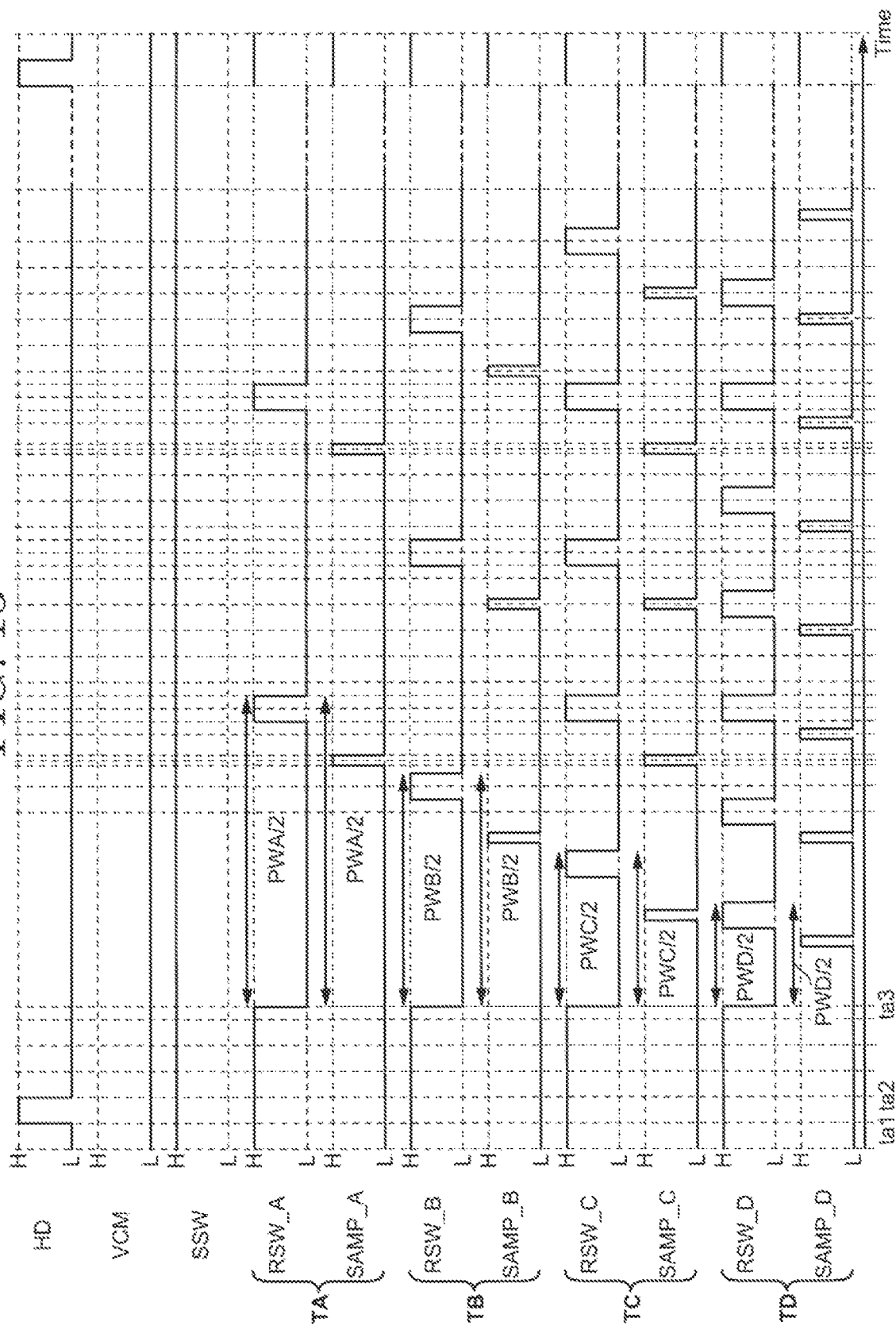
FIG. 13 is a timing chart for explaining a noise scan among the driving methods of a sensing device according to an embodiment of the present invention.

The sensing device 10 executes the noise scan based on a predetermined table (the tables TA to TD) for each of the proximity sensors HS in the first sensing period OP2, as shown in FIG. 8 to FIG. 11, in step 403 (S403) shown in FIG. 12. FIG. 13 shows the driving timing of each table in the noise scan period.

As shown in FIG. 13, the drive signal VCM is fixed to a low voltage (Low, L) in all tables, and a fixed potential is supplied to the first analogue amplifier of the amplifier circuit unit 316, in the noise scan. In addition, the connection switch control signal SSW is supplied with a high voltage (High, H) and is fixed at a high voltage, so that the switch 312 is turned on to maintain the connection between the sensing electrode 130 and the amplifier circuit unit 316.

At a time ta1, the control signal HD changes from a low voltage to a high voltage, and at a time ta2, the control signal HD changes from a high voltage to a low voltage. As a result, the noise scan period starts.

A reset switch control signal RSW_A is supplied with a high voltage from the time ta2 to a time ta3, whereby the reset switch 313 is maintained in the on state, and the amplifier circuit unit 316 is in the reset state, in driving using the table TA (FIG. 8). In addition, a sampling control signal SAMP_A supplied to the AD converter 322 is a low voltage, whereby the AD converter 322 does not perform sampling. Similar to the driving using the table TA, the table TC (FIG. 10), and the table TD (FIG. 11), reset switch control signals RSW_B, RSW_C, and RSW_D are supplied with a high voltage, and sampling control signals SAMP_B, SAMP_C, and SAMP_D are supplied with a low voltage, in driving using the table TB (FIG. 9).

The reset switch control signals RSW_A to RSW_D change from a high voltage to a low voltage, the reset switch 313 is turned off, the back follower capacitor C3 is charged, and the sensing signal Vdet1 based on the capacitance of the back follower capacitor C3 is output from the second analog amplifier 315 to the AD converter 322, at the time ta3. In addition, after the reset switch 313 is turned off, the connection switch control signal SSW supplied to the AD converter 322 becomes a low voltage after being supplied with a high voltage, and based on this, each AD converter 322 executes sampling and outputs the digital signal based on Vdet1 to the signal processing circuit 330.

After that, the sampling control signal SAMP_D is supplied with a low voltage, and the reset switch control signal RSW_D is supplied with a high voltage, whereby the amplifier circuit unit 316 is reset.

As shown in FIG. 13, since each table TA to TD has different sampling frequencies, the timings at which the analog signals are sampled and the timings at which the amplifier circuit unit 316 are reset are different for each table. The sampling frequency of the table TA is the smallest, and increases in order from the tables TB, TC, and TD, in the present embodiment. As a result, the number of scans differs for each table and thus for each proximity sensor HS.

In addition, the signal processing circuit 330 generates the output signal Voutb by performing averaging processing after integrating the digital signal to be output from the AD converter circuit 320 for the scan period and outputs the generated Voutb to the arithmetic circuit 400.

1-4-3. Step 405 (S405)

Figure 14:
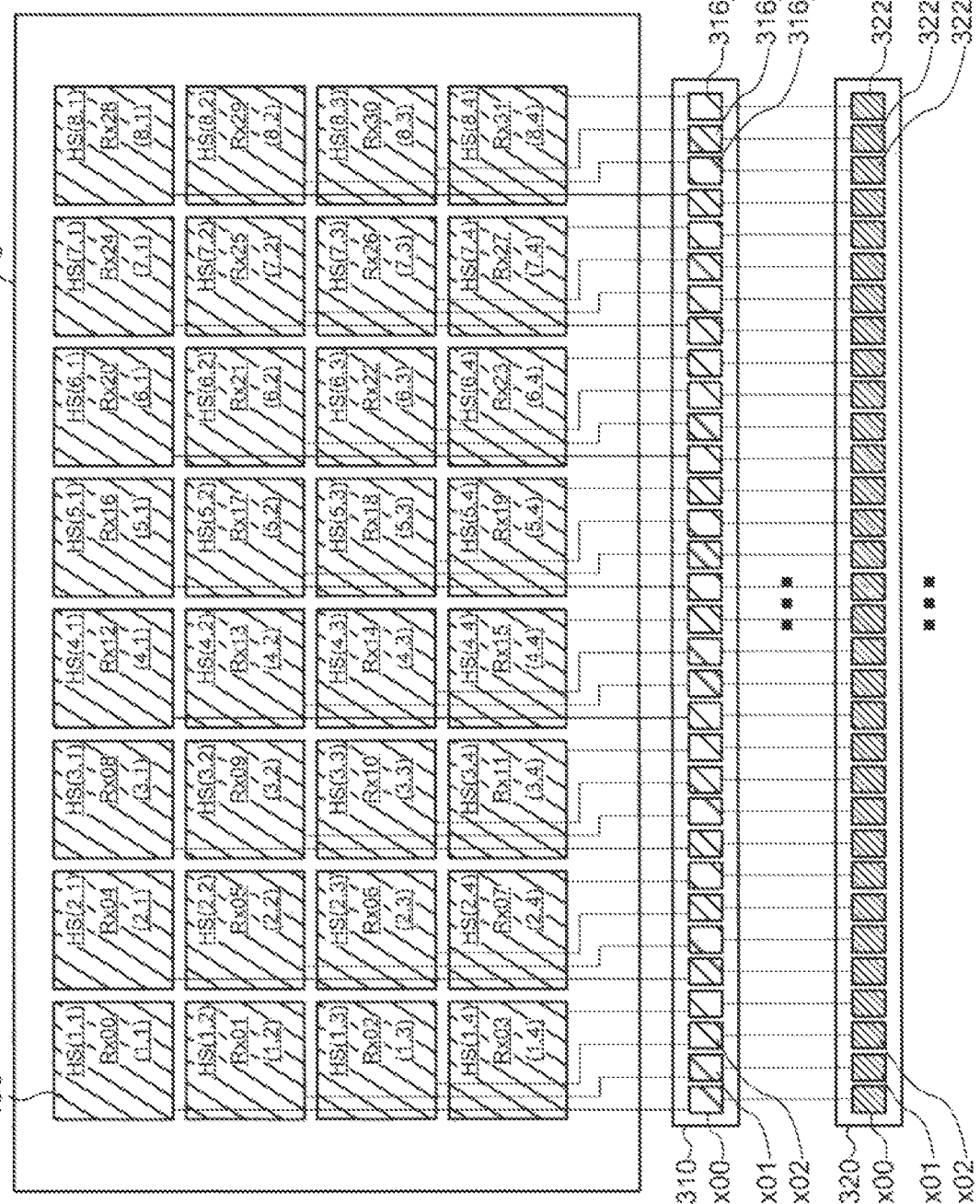
FIG. 14 is a schematic plan view showing a configuration of a sensing electrode and a sensing circuit for explaining a table TE (TABLE E (TE)) drive, a table TF (TABLE F (TF)) drive, a table TG (TABLE G (TG)) drive, and a table TH (TABLE H (TH)) drive, among the driving methods of a sensing device according to an embodiment of the present invention.

The sensing device 10 executes the signal scan on all the proximity sensors HS based on the table TE in the second sensing period OP3, as shown in FIG. 14, in step 405 (S405) shown in FIG. 12.

Figure 15:
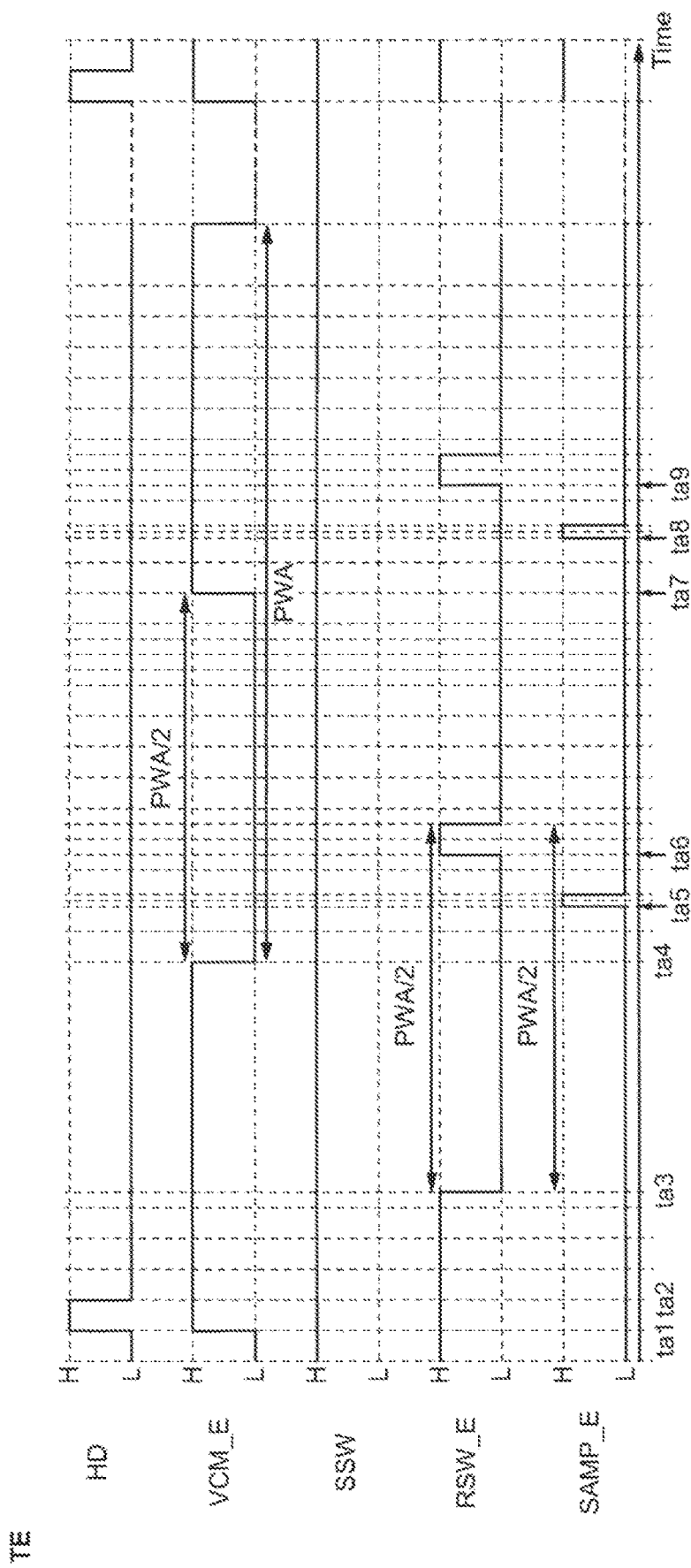
FIG. 15 is a timing chart for explaining a table TE (TABLE E (TE)) drive among the driving methods of a sensing device according to an embodiment of the present invention.

The connection switch control signal SSW is fixed at a high voltage for the applicable period, as shown in FIG. 15, in the driving using the table TE, whereby the sensing electrode 130 and the amplifier circuit 316 are maintained in a connected state for applicable period.

The control signal HD changes from the low voltage to the high voltage at the time ta1, and the control signal HD changes from the high voltage to the low voltage at the time ta2, as shown in FIG. 15, in the driving using the table TE. As a result, the signal scan period starts.

In addition, a scan drive signal VCM_E changes from a low voltage to a high voltage at the time ta1, and changes from a high voltage to a low voltage at a time ta4. As described above, the scan drive signal VCM_E is an AC square wave having a predetermined amplitude and period, and the scan drive signal VCM_E having such a period is supplied to the first analog amplifier 314 of the amplifier circuit unit, in the signal scan using the table TE.

In addition, a reset switch control signal RSW_E is a high voltage, the reset switch 313 is turned on, and the amplifier circuit unit 316 is in the reset state at the time tat. Further, the sampling control signal SAMP_A is a low voltage and the AD converter circuit 320 does not execute sampling.

The scan drive signal VCM is still at a high voltage, while the reset switch control signal RSW_E changes from a high voltage to a low voltage, and the reset switch 313 of the amplifier circuit unit 316 is turned off, whereby the capacitance corresponding to the capacitance state of the sensing electrode 130 is charged to the back follower capacitor C3, and the output based on the capacitance is output from the first analog amplifier 314, at the time ta3. In addition, a sampling control signal SAMP_E is supplied with a low voltage, and the AD converter circuit 320 does not execute sampling at this time.

The scan drive signal VCM_E changes from a high voltage to a low voltage at the time ta4. After the time ta4, the sampling control signal SAMP_E is once supplied with a high voltage. As a result, at a time ta5, the AD converter circuit 320 samples the sensing signal Vdet2 output from the second analog amplifier 315 (the AFE) using the AD converter 322, converts the sensing signal Vdet2 into a digital signal and outputs it to the signal processing circuit 330 (sampling of the sensing signal Vdet2 in the first cycle). After that, at a time ta6, the reset switch control signal RSW_E is turned to a high voltage once, the reset switch 313 is in the on state, and after the amplifier circuit unit 316 has passed through the reset state, the reset switch 313 is returned to the charge state (amplified state).

After that, at a time ta7, the scan drive signal VCM_E changes from a low voltage to a high voltage, and the sampling control signal SAMP_E becomes high again at a time ta8 in the state where the scan drive signal VCM_E is a high voltage, and the sampling is executed (sampling of the sensing signal Vdet2 in the second cycle). After that, at a time ta9, the reset switch control signal RSW_E is turned to a high voltage once again, the reset switch 313 is in the on state, and after the amplifier circuit unit 316 has passed through the reset state, the reset switch 313 is returned to the charge state (the amplified state). The above operation is repeated in the signal scan.

In addition, the signal processing circuit 330 generates the output signal Voutc by performing averaging processing after integrating the digital signal to be output from the AD converter circuit 320 for the scan period and outputs the generated Voutc to the arithmetic circuit 400.

Figure 16:
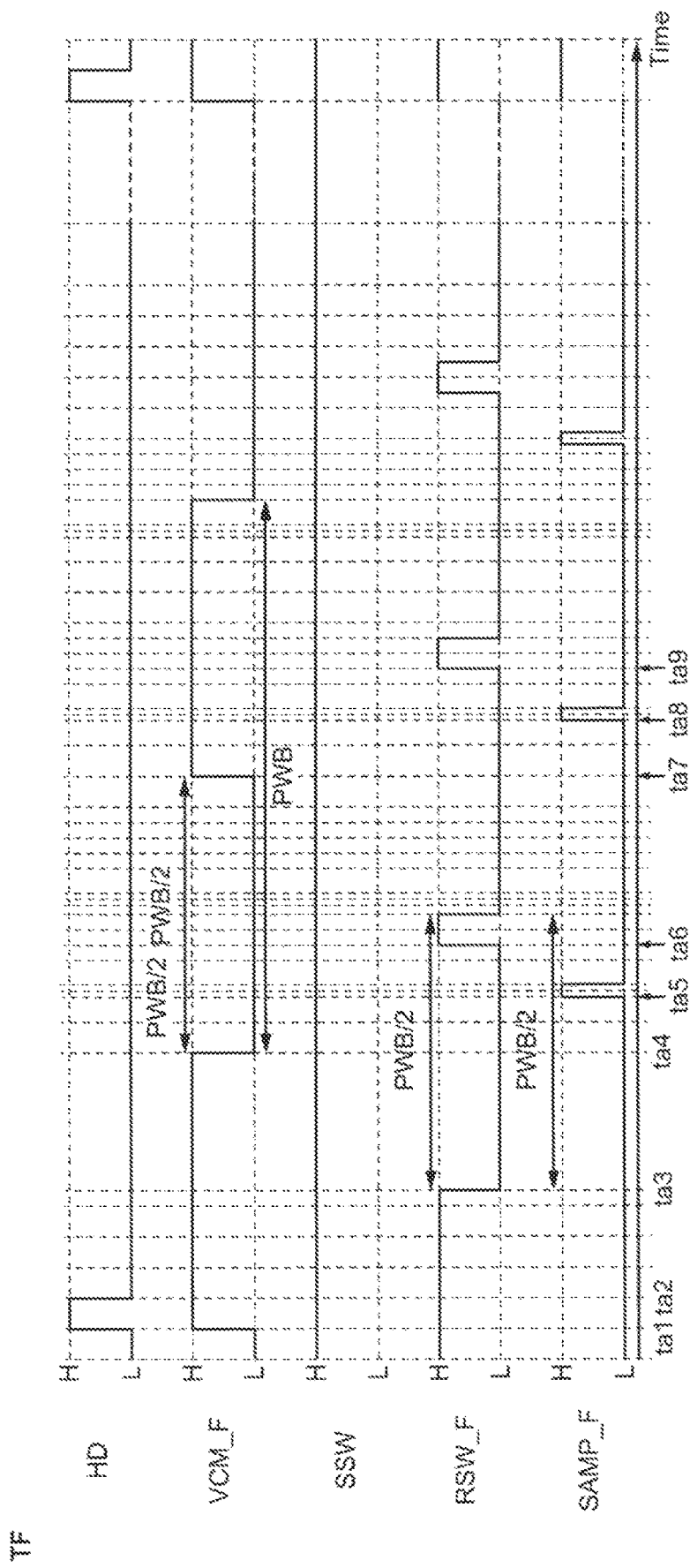
FIG. 16 is a timing chart for explaining a table TF (TABLE F (TF)) drive among the driving methods of a sensing device according to an embodiment of the present invention.
Figure 17:
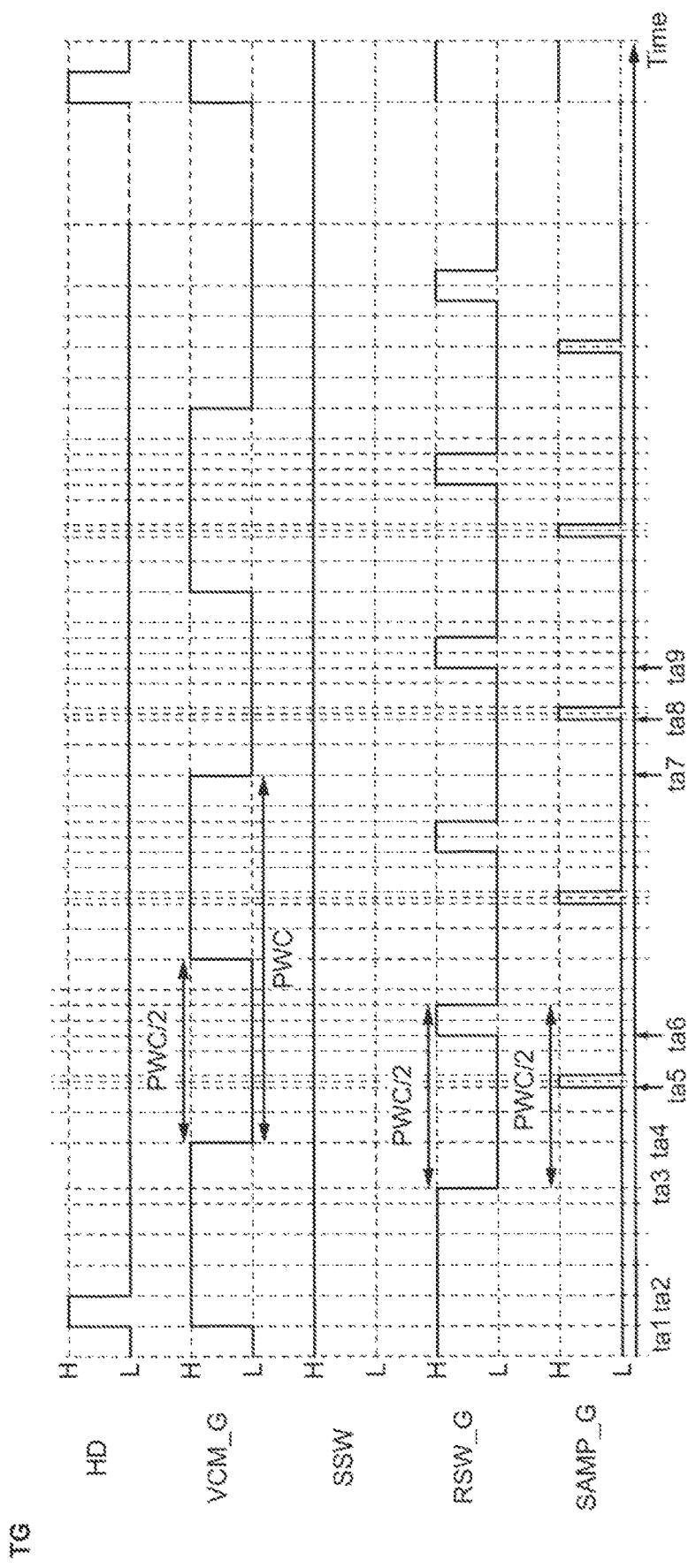
FIG. 17 is a timing chart for explaining a table TG (TABLE G (TG)) drive among the driving methods of a sensing device according to an embodiment of the present invention.
Figure 18:
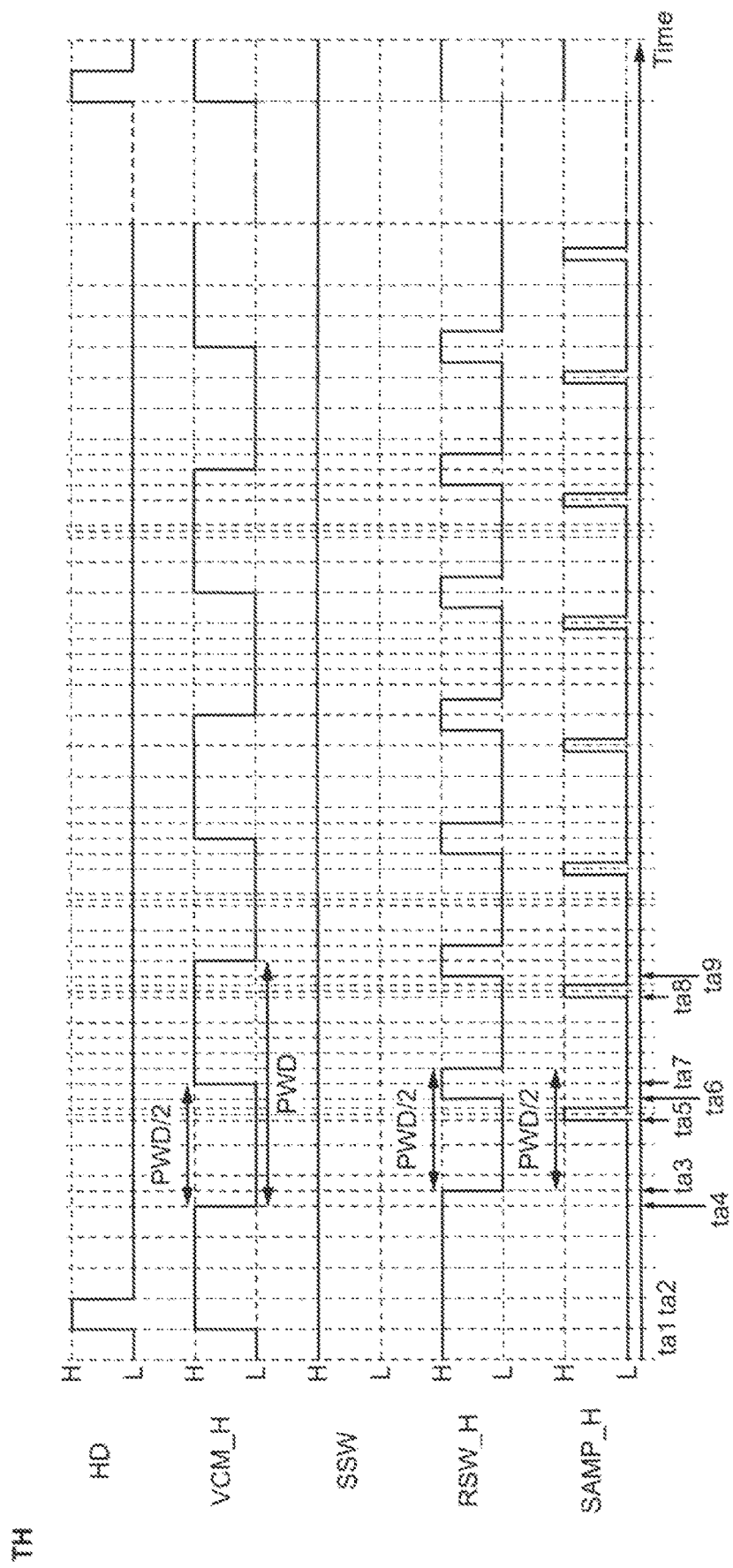
FIG. 18 is a timing chart for explaining a table TH (TABLE H (TH)) drive among the driving methods of a sensing device according to an embodiment of the present invention.

FIG. 16 shows a timing chart of the driving using the table TF, FIG. 17 shows a timing chart of the driving using the table TG, and FIG. 18 shows a timing chart of the driving using the table TH. The cycles of the drive signal VCM, the sampling control signal SAMP, and the reset switch control signal RSW are shown in each table of FIG. 6, and the same control is executed except that each of them is different, so that explanation thereof will be omitted.

1-4-4. Step 407 (S407)

The sensing device 10 determines whether the noise scan using the tables TA to TD and the signal scan using the table TE have been executed for a desired number of frames (for example, 10 frames), in the first sensing period OP2 and the second sensing period OP3, in step 407 (S407) shown in FIG. 12. That is, the sensing device 10 determines whether the frame integration is completed. The determination may be executed by the sense timing control circuit 340 or may be executed by the signal processing circuit 330.

In addition, in this case, the arithmetic circuit 400 stores the sensing signal (output signal Vouta) for 10 frames based on any one of the table TA to the table TD and the sensing signal (output signal Voutb) based on the table TE for each proximity sensor HS.

The sense timing control circuit 340 or the signal processing circuit 330 repeats steps S403 to S407 until the predetermined number of frame integrations is completed, and when the predetermined number of frame integrations is completed, shifts the processing to the following step S409.

1-4-5. Step 409 (S409)

Figure 19:
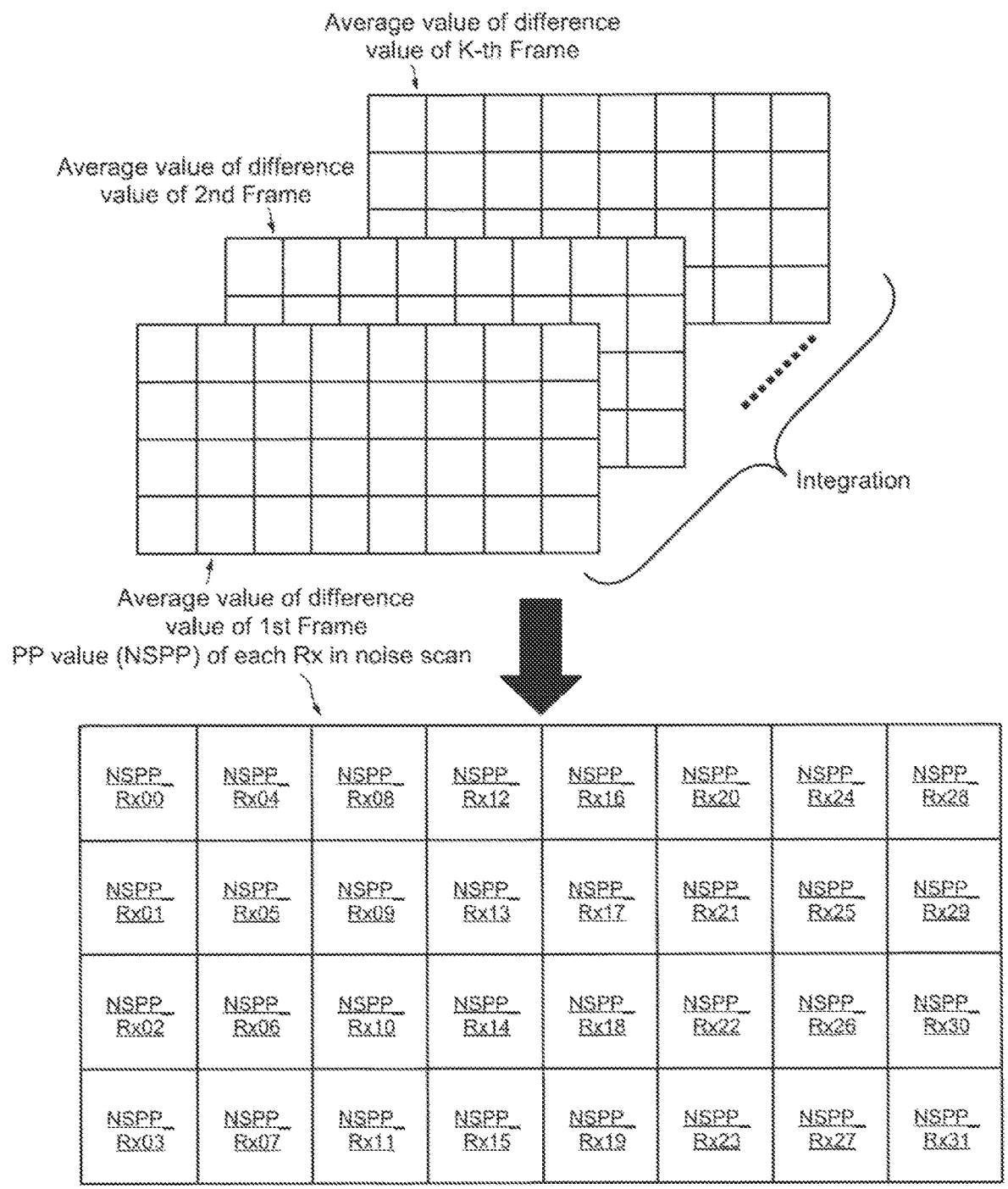
FIG. 19 is a diagram for explaining an example of step 409 (S409) of a driving method of a sensing device according to an embodiment of the present invention.
Figure 20:
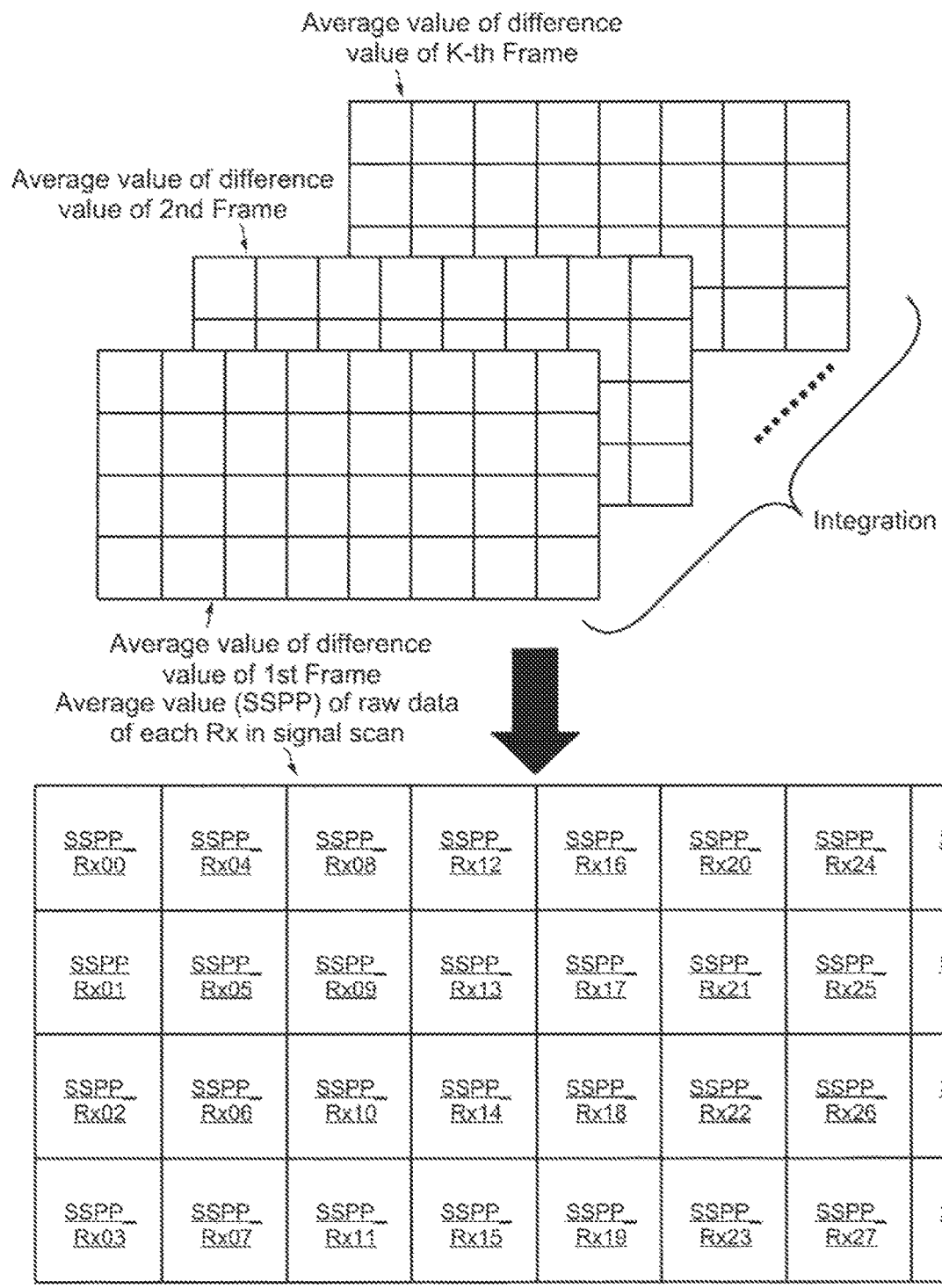
FIG. 20 is a diagram for explaining an example of step 411 (S411) of a driving method of a sensing device according to an embodiment of the present invention.

The sensing device 10 calculates the PP value of each proximity sensor HS using the output signal Voutb, in step 409 (S409) shown in FIG. 12. The calculation of the PP value is executed using the PP value calculation circuit 410 included in the arithmetic circuit 400. As shown in FIG. 19, the PP value calculation circuit 410 extracts the maximum value and the minimum value from the number of sensing signals Voutb corresponding to the number of scans for each proximity sensor HS, and calculates the difference between the maximal value and the minimum value. The calculation result is transmitted as a PP value NSPP (PP value NSPP_Rx00 to Rx31) to the noise amount calculation circuit 430 and the noise amount comparison determination circuit 440.

1-4-6. Step 411 (S411)

Figure 21:
FIG. 21 is a diagram for explaining an example of step 411 (S411) of a driving method of a sensing device according to an embodiment of the present invention.

The sensing device 10 calculates a frame average value using the output signal Voutc and the initial output signal Vouta in step 411 (S411) shown in FIG. 12. The calculation of the frame average value is executed using the frame average value calculation circuit 420 included in the arithmetic circuit 400. The frame average value calculation circuit 420 calculates the average value (SSPP_Rx00 to Rx31) of, for example, 10 times of the sensing signal (output signal Voutc) for each proximity sensor HS (FIG. 20), and calculates the difference between the average value and the sensing signal Vouta (BSTE_Rx00 to Rx31) of the baseline scan based on the previously extracted table TE (FIG. 21). Alternatively, the frame average value calculation circuit may calculate the difference between the sensing signal Voutc and the sensing signal Vouta of the baseline scan, and then average the difference values of 10 times. The calculation result is transmitted as the frame average value AVE (frame average values AVE_Rx00 to Rx31) to the noise amount calculation circuit 430 and the noise amount comparison determination circuit 440.

In addition, the sensing signal Vouta of the base line scan used in the arithmetic processing is a baseline scan performed in the same table as the signal scan. In the above description, the sensing signal Vouta of the base scan performed based on the table TE is used.

1-4-7. Step 413 (S413)

Figure 22:
FIG. 22 is a diagram for explaining an example of step 413 (S413) of a driving method of a sensing device according to an embodiment of the present invention.

The sensing device 10 calculates the noise amount using the PP value NSPP and the frame average value AVE, in step 413 (S413) shown in FIG. 12. The calculation of the noise amount is executed using the noise amount calculation circuit 430 included in the arithmetic circuit 400. The noise amount calculation circuit 430 obtains the noise amount N (noise amount N_Rx00 to Rx31) in each proximity sensor by dividing the PP value NSPP by the frame average value AVE in units of each proximity sensor HS (FIG. 22). The noise amount calculation circuit 430 transmits a noise amount Ndata to the noise amount calculation circuit 430.

1-4-8. Step 415 (S415), Step 417 (S417) and Step 419 (S419)

The sensing device 10 determines whether to perform frequency hopping using the noise amount N, in step 415 (S415), step 417 (S417) and step 419 (S419) shown in FIG. 12. The determination of the noise amount is executed using the noise amount comparison determination circuit 440 included in the arithmetic circuit 400.

For example, the noise amount comparison determination circuit 440 compares the noise amount N for each proximity sensor HS, extracts a maximum value thereof, and determines whether the maximum value is greater than a predetermined threshold value. When it is determined that the maximum value of the noise amount N is greater than the threshold value (YES in step 415 (S415)), the noise amount comparison determination circuit 440 specifies a table when the proximity sensor HS that has extracted the maximum value performs the noise scan, and transmits the table to the sense timing control circuit 340 as the determination result Vjr. The sense timing control circuit 340 refers to the determination result Vjr and the driving table T, and determines whether the table obtained as the determination result has the same sampling frequency as the table on which the current signal scanning is performed. In this case, if they are determined to be the same, it means that the frequency of the charger noise extracted as the noise amount is the same as or approximate to the frequency of the signal scan or an integer multiple thereof. In this case, the sense timing control circuit 340 changes (frequency hopping) from the current signal scan table (the table TE) to another table (for example, the table TH) based on the determination result Vjr, and executes subsequent signal scans based on that table.

Figure 23:
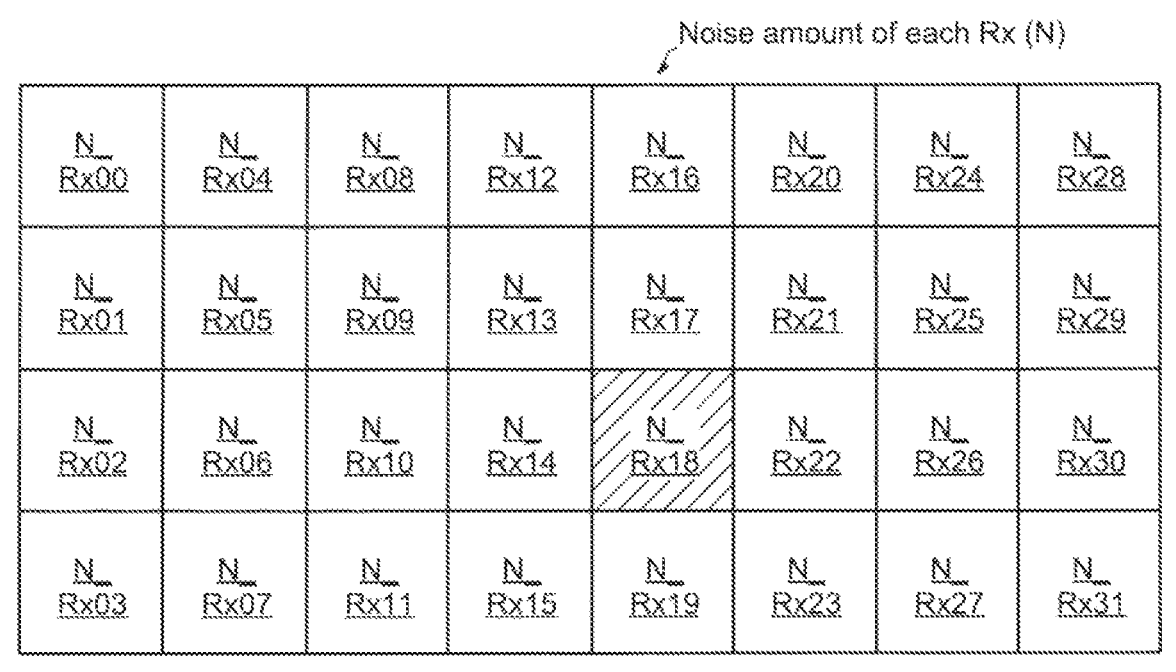

More specifically, for example, as shown in FIG. 23, it is assumed that the noise amount comparison determination circuit 440 determines that the noise amount N_Rx18 is the maximum value and is greater than the threshold value. The noise amount comparison determination circuit 440 determines that the noise amount N_Rx18 is a value calculated by the noise scan using the driving of the table TA (see FIG. 8), and transmits the determination result Vjr to the sensing circuit 300.

The sense timing control circuit 340 included in the sensing circuit 300 refers to the stored table T and determines whether the table (the table TA) obtained from the determination result input from the arithmetic circuit 400 and the table (the table TE) of the current signal scan share the sampling frequency. In this case, since the table TA and the table TE of the current signal scan have the same sampling frequency, the sense timing control circuit 340 changes from the table TE to the table TH and executes the subsequent signal scan.

In addition, the selection of the frequency may be appropriately determined according to the environment in which the sensing device 10 is used, an application, and the like, in the frequency hopping. For example, the frequency hopping may be executed using a plurality of frequencies avoiding an even multiple of the frequency similar to the sensed noise, using a plurality of frequencies avoiding an odd multiple of the frequency similar to the sensed noise, and using a plurality of frequencies avoiding a frequency similar to the sensed noise and including a frequency similar to the frequency of the noise with the smallest amount of sensed noise.

Further, the noise amount comparison determination circuit 440 may adopt a method of specifying a corresponding proximity sensor HS based only on the maximum value of the noise amount without having a threshold value and a table in the proximity sensor HS.

In addition, when it is determined that the maximum value of the noise amount N is smaller than the threshold value, the noise amount comparison determination circuit 440 transmits the result to the sense timing control circuit as the determination result Vjr. In this case, the sense timing control circuit determines that no significant noises have been sensed and continues to perform the signal scan based on the current table.

For example, it is assumed that the noise amount N_Rx22 of Rx22 to be noise-scanned based on the table TC is determined to be the maximum value and larger than the threshold value. Also in this case, the noise amount determination circuit 440 specifies the table when the signal scan is performed, and transmits the table to the sense timing control circuit 340 as the determination result Vjr. The sense timing control circuit 340 refers to the determination result and the table, and determines whether the table obtained as the determination result Vjr has the same sampling frequency as the table on which the current signal scanning is performed. In the above, it is determined that these are different. This means that the frequency (FC) of the charger noise extracted as the noise amount significantly differs from the frequency (FA) of the signal scan. In this case, the sense timing control circuit 340 does not change the table (the table TE) of the current signal scan based on the determination, and performs subsequent signal scans based on that table.

After performing the frequency hopping and after not performing the frequency hopping, the sensing device 10 returns to step 403 (S403) and repeatedly executes steps 403 (S403) to 419 (S419).

1-5. First Modification of Driving Method of Sensing Device 10

The PP value calculation circuit 410 is included in the sensing circuit 300 as compared with the driving method of the sensing device 10 in a first modification of the driving method of the sensing device 10. The calculation of the PP value described in step 409 (S409) is executed using the PP value calculation circuit 410 included in the sensing circuit 300, in the first modification.

The time required for the noise scan can be shortened by simultaneously performing the noise scan with at least two different driving frequencies, in the sensing device 10 according to an embodiment of the present invention.

In addition, the sensing device 10 can detect the position of the sensing object 390 by performing the frequency hopping using a noise-free frequency based on the calculation and determination of the noise amount even if the noise and signal are slight. As a result, even when the frequency of the noise changes frequently, the sensing device 10 changes the drive frequency of the signal scan according to the frequency, so that it is possible to suppress the noise contamination during the signal scan as much as possible.

2. Second Embodiment

A driving method different from the driving method of the sensing device according to the first embodiment will be described in the second embodiment of the present invention. The driving method of the sensing device 10 according to the second embodiment differs from the driving method of the sensing device according to the first embodiment in that step 403' (S403') is executed before step 405 (S405) and step 415 (S415) is executed after step 405 (S405). In the driving method of the sensing device 10 according to the second embodiment, step 403' (S403') will be mainly described, and the same or similar configurations as those of the first embodiment will not be described here.

Figure 24:
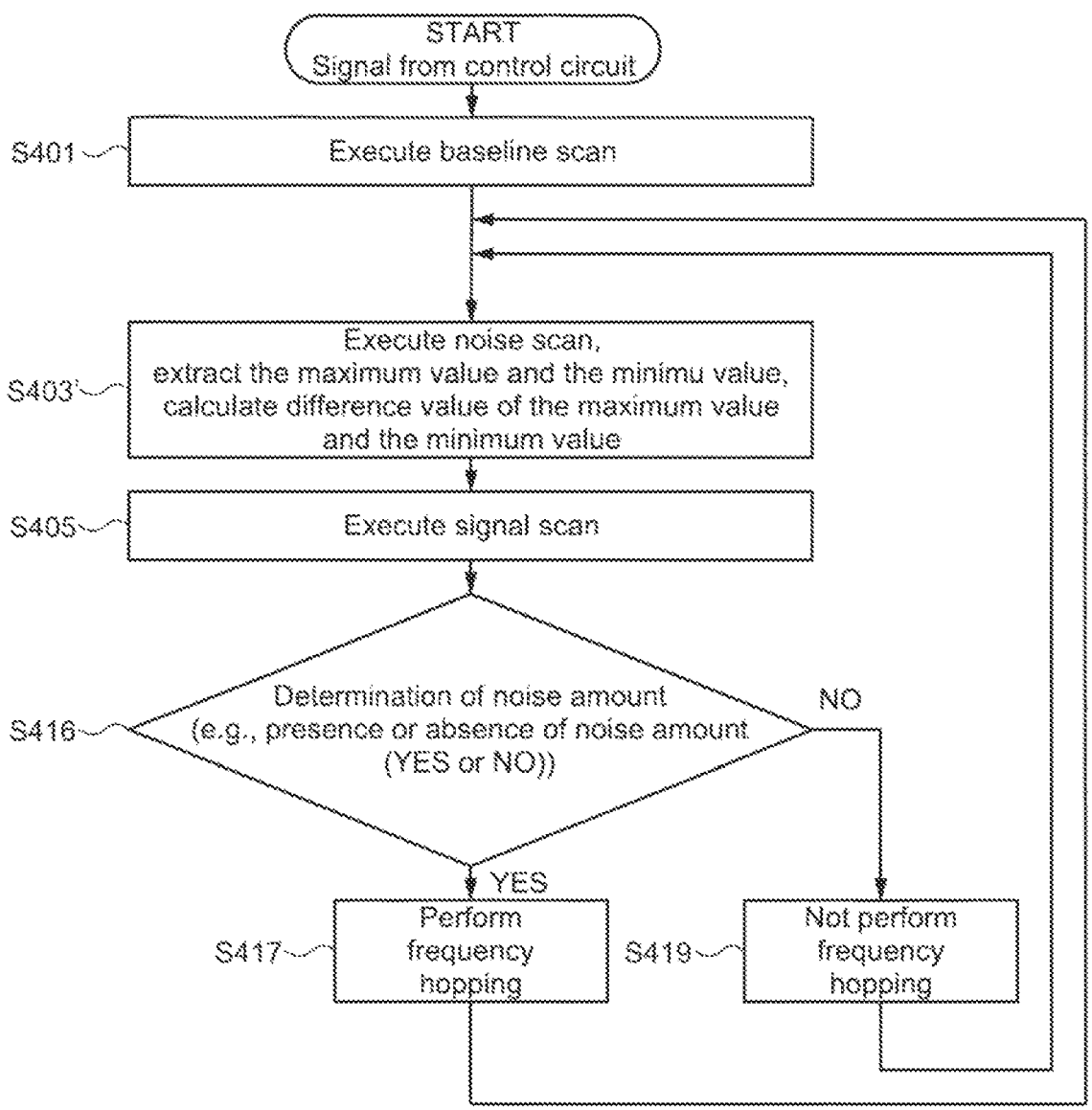
FIG. 24 is a flowchart for explaining a driving method of a sensing device according to a second embodiment of the present invention.

FIG. 24 is a flowchart for explaining a driving method of the sensing device 10 according to the second embodiment of the present invention.

The noise scan is executed based on the table TA to the table TD assigned to each proximity sensor HS in the same manner as in the first embodiment, and the digital signal output from the AD converter 322 by each scan is accumulated in the signal processing circuit 330, in step 403' (S403') shown in FIG. 24, in the noise scan period. In this case, the signal processing circuit 330 further obtains the maximum value and the minimum value of the accumulated digital signal, calculates the difference between the maximal value and the minimum value, and outputs the calculated result to the arithmetic circuit as Voutb'. The arithmetic circuit 400 replaces Voutb' with a noise amount N', compares the noise amount with the threshold value in the noise amount calculation circuit 430 and the noise amount comparison determination circuit 440, and specifies the proximity sensor HS and the table that output the noise amount greater than the threshold value. The subsequent processing is the same as that of the first embodiment.

According to such a configuration, the PP value calculation circuit 410 and the frame average value calculation circuit 420 are not required in the arithmetic circuit 400, and the processing by the arithmetic circuit 400 can be reduced.

Each of the embodiments described above as an embodiment of the present invention can be appropriately combined and implemented as long as no contradiction is caused.

It is understood that, even if the advantageous effect is different from those provided by each of the above-described sensing device and the driving method of the sensing device, the effect obvious from the description in the specification or easily predicted by persons ordinarily skilled in the art is apparently derived from the present invention.

What is claimed is:

1. A sensing device comprising;
a plurality of sensing electrodes arranged in a row direction and a column direction;
a sensing circuit including a plurality of read-out circuits respectively connected to the plurality of sensing electrodes and a control circuit configured to control the plurality of read-out circuits; and
an arithmetic circuit that processes a sensing signal output from the sensing circuit;
wherein
the plurality of sensing electrodes and the plurality of read-out circuits are connected one-to-one via wiring,
the sensing circuit is configured to store a driving table that stores multiple sampling frequencies different from each other,
the control circuit is configured to read out the multiple sampling frequencies from the driving table, drive simultaneously the plurality of read-out circuits by using the multiple sampling frequencies, and output a plurality of output signals obtained by the driving to the arithmetic circuit, and the arithmetic circuit is configured to process the plurality of output signals from the control circuit, and to calculate an amount of noise.

2. The sensing device according to claim 1, wherein
each of the plurality of read-out circuits is configured to detect a first sensing signal based on an initial drive signal, a second sensing signal based on a predetermined fixed voltage and a third sensing signal based on a detection drive signal,
the multiple sampling frequencies include at least a first frequency and a second frequency different from the first frequency,
the plurality of read-out circuits includes a first read-out circuit and a second read-out circuit,
the first read-out circuit is configured to output a second sensing signal based on a sampling frequency of the first frequency, and output a third sensing signal based on a sampling frequency of the first frequency,
the second read-out circuit is configured to output a second sensing signal based on a sampling frequency of the second frequency, and output a third sensing signal based on a sampling frequency of the first frequency, and
the arithmetic circuit is configured to calculate the amount of noise using the second sensing signal and the third sensing signal output from the first read-out circuit and the second sensing signal and the third sensing signal output from the second read-out circuit.

3. The sensing device according to claim 2, wherein
output of a second signal and a third signal by the first read-out circuit is performed a plurality of times,
output of the second signal and the third signal by the second read-out circuit is performed a plurality of times, and
the arithmetic circuit is configured to store the second signals and the third signals from the first circuit and the second circuit.

4. The sensing device according to claim 3, wherein the detection drive signal includes the first frequency.

5. The sensing device according to claim 4, wherein
the initial drive signal has the first frequency,
the first read-out circuit is configured to output a first sensing signal based on a sampling frequency of the first frequency, and
the second read-out circuit is configured to output a first sensing signal based on a sampling frequency of the first frequency.

6. The sensing device according to claim 5, wherein
the arithmetic circuit is configured to calculate a signal scan value of the sensing electrode based on the first sensing signal and the third sensing signal output from the first read-out circuit, and calculate a signal scan value for the sensing electrode based on the first sensing signal and the third sensing signal output from the second read-out circuit.

7. The sensing device according to claim 6, wherein
the arithmetic circuit is configured to calculate a signal scan value of the sensing electrode based on the plurality of second sensing signals from the first read-out circuit, and calculate a signal scan value for the sensing electrode based on the plurality of second sensing signals output from the second read-out circuit.

8. The sensing device according to claim 7, wherein
the arithmetic circuit is configured to calculate the presence/absence of noise in the sensing electrode based on the signal scan value and the noise scan value.

9. A driving method of a sensing device, the sensing device including a plurality of sensing electrodes arranged in a row direction and a column direction, a sensing circuit including a plurality of read-out circuits respectively connected to the plurality of sensing electrodes and a control circuit for controlling the plurality of read-out circuits, and an arithmetic circuit that arithmetically is configured to process a sensing signal output from the sensing circuit; the plurality of sensing electrodes and the plurality of read-out circuits are connected one-to-one via wiring; and the sensing circuit is configured to store a driving table that stores multiple sampling frequencies different from each other, the method comprising:

reading out the multiple sampling frequencies different from each other;

driving simultaneously the plurality of read-out circuits at the multiple sampling frequencies different from each other;

generating a plurality of output signals obtained by the driving;

performing arithmetic processing on the plurality of output signals read out using the multiple sampling frequencies different from each other; and calculating an amount of noise.

* * * * *